(12) United States Patent
Fukazawa

(10) Patent No.: US 8,326,044 B2
(45) Date of Patent: Dec. 4, 2012

(54) IMAGE PROCESSING PROGRAM PRODUCT AND IMAGE PROCESSING APPARATUS

(75) Inventor: Takashi Fukazawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 958 days.

(21) Appl. No.: 12/155,641

(22) Filed: Jun. 6, 2008

(65) Prior Publication Data

US 2009/0010532 A1    Jan. 8, 2009

(30) Foreign Application Priority Data

Jun. 6, 2007   (JP) ................................. 2007-150545

(51) Int. Cl.
 *G06K 9/00* (2006.01)
(52) U.S. Cl. ...................................................... 382/195
(58) Field of Classification Search .................... 382/195
 See application file for complete search history.

(56) References Cited

U.S. PATENT DOCUMENTS

| | | | |
|---|---|---|---|
| 4,045,655 A | 8/1977 | Suzuki et al. | |
| 5,150,422 A | 9/1992 | Kitakado et al. | |
| 5,878,156 A | 3/1999 | Okumura | |
| 6,343,137 B1 | 1/2002 | Kimura et al. | |
| 6,658,163 B1 | 12/2003 | Takaoka | |
| 6,993,184 B2* | 1/2006 | Matsugu | 382/173 |
| 7,589,765 B2 | 9/2009 | Kitajima | |
| 7,805,672 B2* | 9/2010 | Kobashi | 715/252 |
| 2003/0025835 A1* | 2/2003 | Segman | 348/577 |
| 2004/0071352 A1 | 4/2004 | Mizoguchi et al. | |
| 2005/0036660 A1* | 2/2005 | Otsuka et al. | 382/104 |
| 2005/0063604 A1* | 3/2005 | Kita | 382/254 |
| 2005/0063606 A1 | 3/2005 | Kita | |
| 2006/0098104 A1* | 5/2006 | Fujii et al. | 348/222.1 |
| 2007/0147697 A1* | 6/2007 | Lee et al. | 382/260 |

FOREIGN PATENT DOCUMENTS

| | | |
|---|---|---|
| EP | 1 513 103 A2 | 3/2005 |
| EP | 1 837 803 A2 | 9/2007 |
| JP | A-2003-58880 | 2/2003 |
| JP | A-2003-279411 | 10/2003 |
| JP | A-2005-092724 | 4/2005 |
| JP | A-2006-174281 | 6/2006 |

(Continued)

OTHER PUBLICATIONS

Weickert, Joachim. "Anisotrpoic diffusion in image processing". [online] Kaiserslautern, Universitat, Diss., 1996. Chapter 5, p. 101 [retrieved on Sep. 8, 2011], retrieved from: Google Scholar.*

(Continued)

*Primary Examiner* — Atiba O Fitzpatrick
*Assistant Examiner* — Thomas A James
(74) *Attorney, Agent, or Firm* — Oliff & Berridge, PLC

(57) ABSTRACT

An image processing apparatus includes: a first area extraction unit that extracts as a first area an area assuming an intensity value equal to or greater than a first threshold value from an image; a second area extraction unit that extracts as a second area an area assuming an intensity value equal to or greater than a second threshold value smaller than the first threshold value from the image; a light source area designating unit that designates as a light source area an area in the image containing a light source based upon characteristic quantities indicating characteristics of the first area and the second area; and a control unit that controls the first area extraction unit, the second area extraction unit and the light source area designating unit.

17 Claims, 20 Drawing Sheets

FOREIGN PATENT DOCUMENTS

JP    A-2007-129622    5/2007

OTHER PUBLICATIONS

Extended European Search Report for European Patent Application No. 08157732.2, mailed on Aug. 31, 2010.

European Office Action issued in European Application No. 08 157 732.2 dated May 11, 2011.

Dec. 6, 2011 Office Action in Japanese Patent Application No. 2007-150545 (with English translation).

* cited by examiner

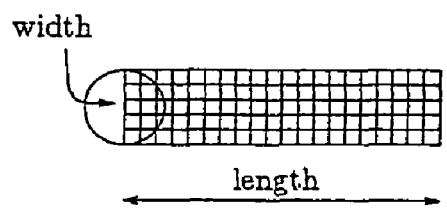
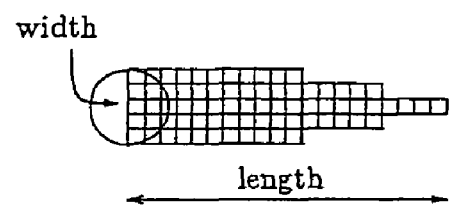
FIG. 8 A
FIG. 8 B

FIG.13 A
FIG.13 B
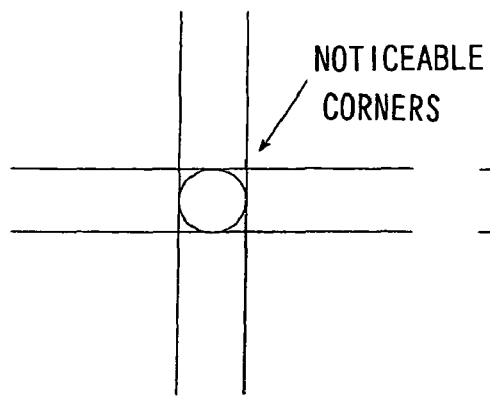
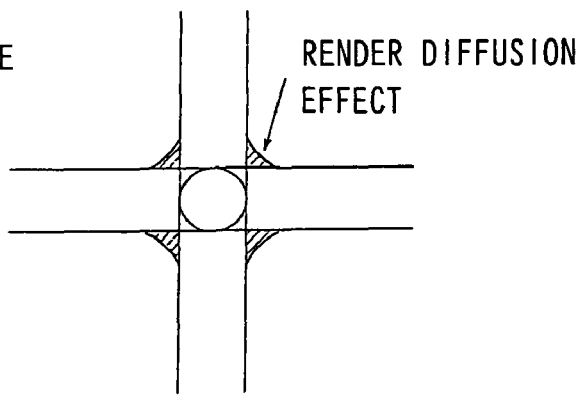

IMAGE PROCESSING PROGRAM PRODUCT AND IMAGE PROCESSING APPARATUS

INCORPORATION BY REFERENCE

The disclosure of the following priority application is herein incorporated by reference:
Japanese Patent Application No. 2007-150545 filed Jun. 6, 2007

BACKGROUND OF THE INVENTION

1. Field of the Invention

The present invention relates to an image processing program product and an image processing apparatus.

2. Description of Related Art

Japanese Laid Open Patent Publication No. 2005-92724 discloses a bright beam drawing processing method. In this bright beam drawing processing method, a bright beam is drawn starting from a bright point pixel by detecting bright point pixels within an image.

SUMMARY OF THE INVENTION

However, bright points within the image are detected based upon intensity values in the bright beam drawing processing method disclosed in Japanese Laid Open Patent Publication No. 2005-92724, and this gives rise to a concern that a point at which a light source is not actually photographed may be detected as a bright point.

According to the 1st aspect of the present invention, a computer-readable computer program product containing an image processing control program with the control program which comprises: a first area extraction instruction for extracting as a first area an area assuming an intensity value equal to or greater than a first threshold value from an image; a second area extraction instruction for extracting as a second area an area assuming a intensity value equal to or greater than a second threshold value smaller than the first threshold value from the image; and a light source area designation instruction for designating an area in the image that contains a light source as a light source area based upon characteristic quantities indicating characteristics of the first area and the second area.

According to the 2nd aspect of the present invention, in the image processing program product according to the 1st aspect, it is preferred that a decision is made in response to the light source area designation instruction, as to whether or not the second area is the light source area based upon an inclusive relationship that may exist between the second area and the first area.

According to the 3rd aspect of the present invention, in the image processing program product according to the 1st aspect, it is preferred that a decision is made in response to the light source area designation instruction, as to whether or not the second area is the light source area based upon a ratio of an areal size of the second area and an areal size of the first area present within the second area.

According to the 4th aspect of the present invention, in the image processing program product according to the 1st aspect, it is preferred that a decision is made in response to the light source area designation instruction, as to whether or not the second area is the light source area based upon a positional relationship between a gravitational center of the second area and a gravitational center of the first area present within the second area.

According to the 5th aspect of the present invention, in the image processing program product according to the 1st aspect, it is preferred that a decision is made in response to the light source area designation instruction, as to whether or not the second area is the light source area based upon a ratio of an areal size of the second area and an areal size of the first area present within the second area and a positional relationship between a gravitational center of the second area and a gravitational center of the first area present within the second area.

According to the 6th aspect of the present invention, in the image processing program product according to the 5th aspect, it is preferred that a light source position present inside the light source area is determined in response to the light source area designation instruction, based upon the positional relationship between the gravitational center of the second area and the gravitational center of the first area present within the second area.

According to the 7th aspect of the present invention, in the image processing program product according to the 6th aspect, it is preferred that the control program further comprises a bright beam drawing instruction for drawing bright beams along a plurality of directions from a starting point set at the light source position designated in response to the light source area designation instruction.

According to the 8th aspect of the present invention, in the image processing program product according to the 7th aspect, it is preferred that the control program further comprises a bright beam size determination instruction for determining a width and length of the bright beams to be drawn based upon a size of the image and the areal size of the light source area.

According to the 9th aspect of the present invention, in the image processing program product according to the 7th aspect, it is preferred that the control program further comprises a bright beam color determination instruction for determining a color of the bright beams to be drawn based upon color information provided at a point set apart from the gravitational center of the light source area by a predetermined distance or more.

According to the 10th aspect of the present invention, in the image processing program product according to the 8th aspect, it is preferred that the control program further comprises: a bright beam color determination instruction for determining a color of the bright beams to be drawn based upon information provided at a point set apart from the gravitational center of the light source area by a predetermined distance or more, wherein: the bright beams are drawn in response to the bright beam drawing instruction, based upon the length of the bright beams determined in response to the bright beam size determination instruction and the color of the bright beams determined in response to the bright beam color determination instruction.

According to the 11th aspect of the present invention, in the image processing program product according to the 10th aspect, it is preferred that the bright beams are drawn in response to the bright beam drawing instruction, so that intensity of the bright beams is attenuated through simple attenuation as a distance from the light source position increases if the length of the bright beams is smaller than a predetermined value and the bright beams are drawn so as to cyclically attenuate and amplify the intensity of the bright beams as the distance from the light source position increases if the length of the bright beams is equal to or greater than the predetermined value.

According to the 12th aspect of the present invention, in the image processing program product according to the 10th aspect, it is preferred that the hue of the bright beams is cyclically altered in response to the bright beam drawing instruction, if the color of the bright beams is white.

According to the 13th aspect of the present invention, in the image processing program product according to the 7th aspect, it is preferred that a light diffusion effect is rendered over and area where a plurality of bright beams intersect one another in response to the bright beam drawing instruction.

According to the 14th aspect of the present invention, an image processing apparatus, comprising: a first area extraction unit that extracts as a first area an area assuming an intensity value equal to or greater than a first threshold value from an image; a second area extraction unit that extracts as a second area an area assuming an intensity value equal to or greater than a second threshold value smaller than the first threshold value from the image; a light source area designating unit that designates as a light source area an area in the image containing a light source based upon characteristic quantities indicating characteristics of the first area and the second area; and a control unit that controls the first area extraction unit, the second area extraction unit and the light source area designating unit.

According to the 15th aspect of the present invention, in the image processing apparatus according to the 14th aspect, it is preferred that the light source area designating unit determines whether or not the second area is the light source area based upon a ratio of an areal size of the second area and an areal size of the first area present within the second area and a positional relationship between a gravitational center of the second area and a gravitational center of the first area present within the second area.

According to the 16th aspect of the present invention, in the image processing apparatus according to the 15th aspect, it is preferred that the light source area designating unit designates a light source position within the light source area based upon the positional relationship between the gravitational center of the second area and the gravitational center of the first area present within the second area.

According to the 17th aspect of the present invention, the image processing apparatus according to the 16th aspect further comprises a bright beam drawing unit that draws bright beams along a plurality directions from a starting point set at the light source position designated by the light source area designating unit.

According to the 18th aspect of the present invention, the image processing apparatus according to the 17th aspect further comprises: a bright beam size determining unit that determines a width and a length of the bright beams to be drawn based upon a size of the image and the areal size of the light source area; and a bright beam color determining unit that determines a color of the bright beams to be drawn based upon color information provided at a point set apart from a gravitational center of the light source area by a predetermined distance or more, wherein: the bright beam drawing unit draws the bright beams based upon the length of the bright beams determined by the bright beam size determining unit and the color of the bright beams determined by the bright beam color determining unit.

BRIEF DESCRIPTION OF THE DRAWINGS

FIG. 8A and FIG. 8B schematically illustrates the width and length of a star being drawn;

FIG. 13A and FIG. 13B schematically illustrates an effect achieved by diffusing the central area of a star;

DETAIL DESCRIPTION OF PREFERRED EMBODIMENTS

Figure 1:
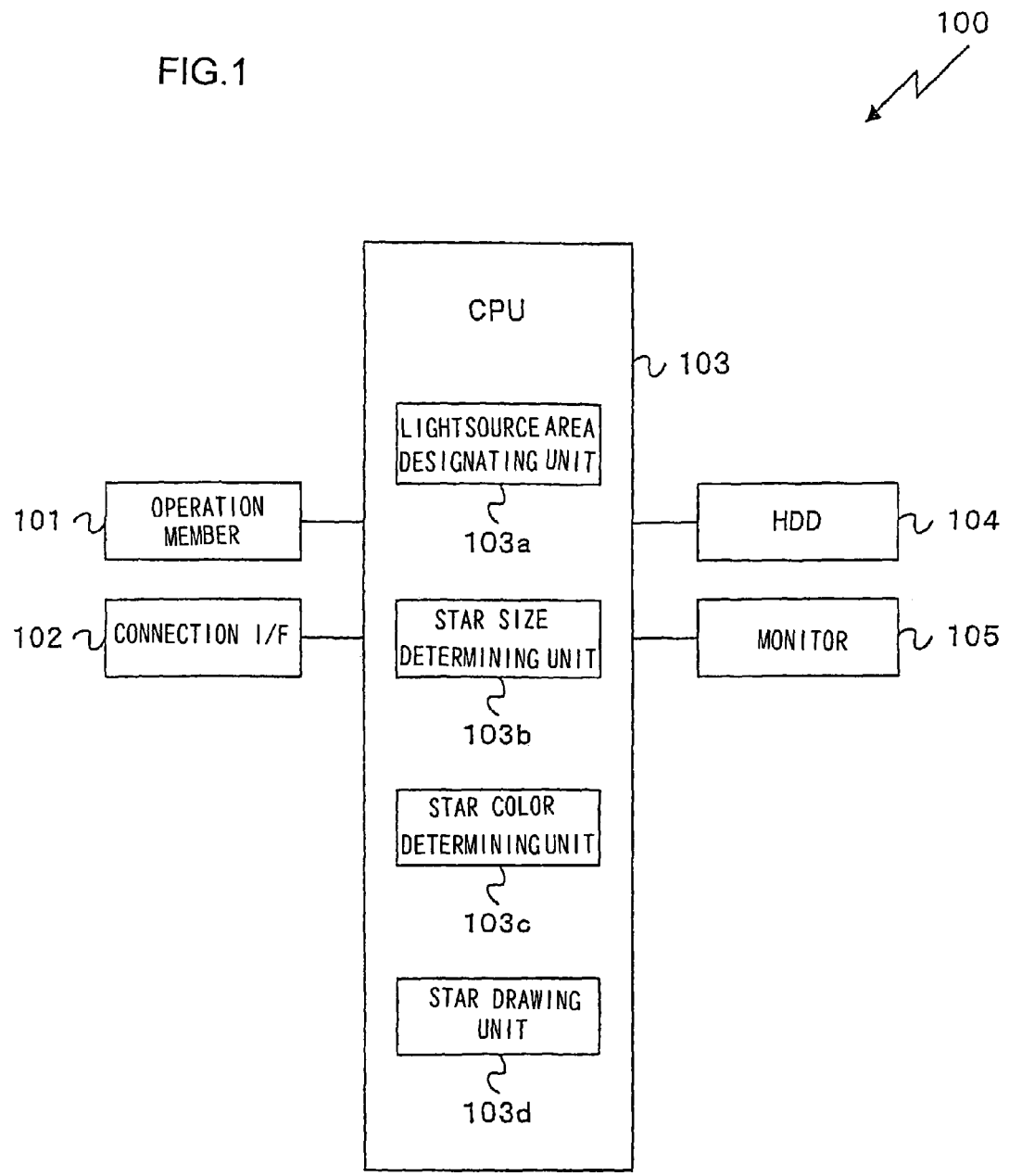
FIG. 1 is a block diagram showing the structure adopted in the image processing apparatus achieved in an embodiment of the present invention.

The following is an explanation of the best mode for carrying out the present invention, given in reference to the drawings. FIG. 1 is a block diagram showing the structure adopted in an embodiment of the image processing apparatus according to the present invention. An image processing apparatus 100, which may be a personal computer, includes an operation member 101, a connection I/F (connection interface) 102, a control device 103, an HDD (hard disk drive) 104 and a monitor 105.

The operation member 101 includes various devices operated by the user, such as a keyboard and a mouse. The connection I/F 102, which is an interface used to achieve a connection with an external device, may be, for instance, a USB interface via which the image processing apparatus is connected with a digital camera through a wired connection or a wireless LAN module via which a wireless connection is achieved. Image data originating from a digital camera can be taken into the image processing apparatus via the connection I/F 102 in the embodiment.

The HDD 104 is a storage device in which image data having been taken in via the connection I/F 102 are recorded and various computer programs and the like to be executed by the control device 103 are also stored. At the monitor 105, which may be a liquid crystal monitor, various types of display data output from the control device 103 are displayed.

The control device 103, constituted with a CPU, a memory and other peripheral circuits, includes functional units such as a light source area designating unit 103a, a star size determining unit 103b, a star color determining unit 103c and a star drawing unit 103d. The control device 103 in the embodiment reads an image recorded in the HDD 104 and draws a star over an area (light source area) containing a light source within the image. The term "star" in this context refers to bright beams drawn along a plurality of directions extending from the gravitational center of a light source area within the image. Such bright beams may be drawn along, for instance, four directions, six directions or eight directions extending from the gravitational center of the light source area. The following explanation is provided by assuming that image data expressed in the RGB color space are recorded in the HDD 104.

The light source area designating unit 103a designates a light source area within the image. More specifically, the light source area designating unit 103a extracts a light source area in reference to intensity values Y at the pixels. The light source area extraction is executed by calculating the intensity value Y defined as in (1) below based upon pixel values (R, G, B) ($0 \leq R, G, B \leq 255$) for each pixel.

$$Y=0.2990 \times R+0.5870 \times G+0.1140 \times B \quad (1)$$

An area within the image constituted with pixels having intensity values Y calculated as expressed in (1) equal to or greater than a predetermined value may not always be an actual light source area, since the image may contain an area other than a light source area, such as a white wall where intensity values Y are equal to or greater than the predetermined value. The following processing is executed in the embodiment so as to accurately designate the correct area as a light source area.

The light source area designating unit 103a extracts an area constituted with pixels having intensity values Y calculated as expressed in (1) equal to or greater than a predetermined intensity value $Y_1$ (e.g., $Y_1=250$). If there are a plurality of such areas, each constituted with pixels assuming intensity values Y equal to or greater than the predetermined intensity value $Y_1$, within the image, the plurality of areas are extracted. An area extracted as described above is to be referred to as a first extracted area, so as to distinguish it from other areas to be explained later.

Figure 2:
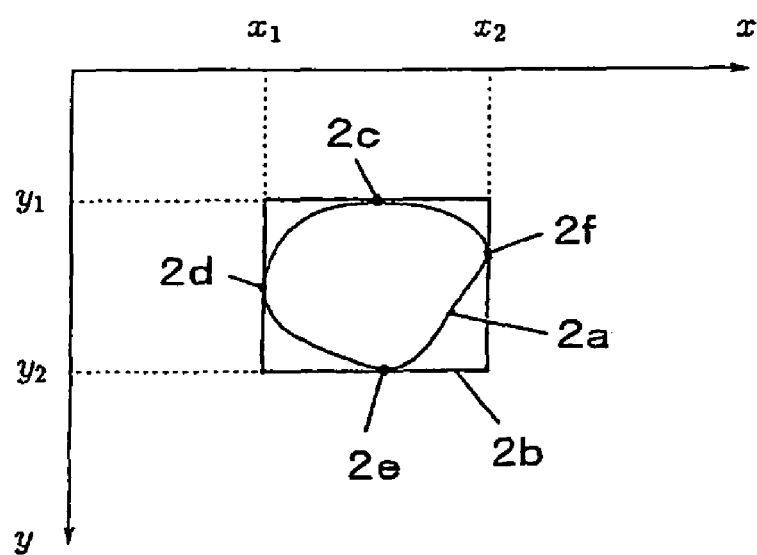
FIG. 2 presents a specific example of points of contact at which the first extracted area and the outer frame may contact each other.

The light source area designating unit 103a calculates the areal size and the gravitational center position of each first extracted area it has extracted. The gravitational center position may be calculated in the form of specific coordinate values (an x-coordinate value and a y-coordinate value) in the xy coordinate system representing the entire image. The light source area designating unit 103a defines a specific outer frame that contacts the outline of the first extracted area and calculates the coordinate values (an x-coordinate value and a y-coordinate value) of a contact point at which the first extracted area and the outer frame contact each other. For instance, if a first extracted area 2a, such as that shown in FIG. 2, has been extracted, the light source area designating unit 103a sets an outer frame 2b and calculates the coordinate values assumed at contact points 2c 2d, 2e, and 2f at which the first extracted area 2a and the outer frame 2b are in contact.

The light source area designating unit 103a calculates the distances $a_i$ (i=1, 2, . . . , 8) from the gravitational center 3a of the first extracted area to the edge of the area along eight different directions, i.e., upward, downward, left, right and the diagonals. The light source area designating unit 103a stores the areal size, the gravitational center position coordinate values, the coordinate values of the contact points at which the area and the outer frame are in contact and the distances from the gravitational center to the area edge having been calculated as described above into memory.

The light source area designating unit 103a extracts an area constituted with pixels having intensity values Y calculated as expressed in (1) equal to or greater than a predetermined intensity value $Y_2$ (e.g., $Y_2=240$). If there are a plurality of such areas, each constituted with pixels assuming intensity values Y equal to or greater than the predetermined intensity value $Y_2$, within the image, the plurality of areas are extracted. An area extracted as described above is to be referred to as a second extracted area, so as to distinguish it from the first extracted area mentioned earlier.

Figure 3:
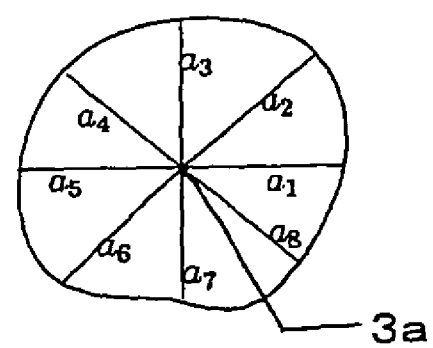
FIG. 3 presents a specific example of the distances that may be measured along eight different directions extending from the gravitational center of the first extracted area to the edge of the first extracted area.

The light source area designating unit 103a calculates the areal size and the coordinate values (an x-coordinate value and a y-coordinate value) of the gravitational center position of each second extracted area it has extracted. The light source area designating unit 103a calculates the distances $b_i$ (i=1, 2, . . . , 8) from the gravitational center of the second extracted area to the edge of the area along eight different directions, i.e., upward, downward, left, right and the diagonals, as it did for the first extracted area, as explained in reference to FIG. 3. The light source area designating unit 103a stores the areal size, the gravitational center position coordinate values, and the distances from the gravitational center to the area edge having been calculated as described above into memory.

Figure 4:
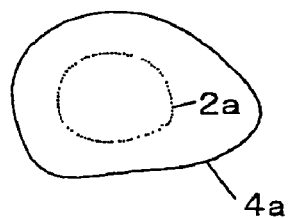
FIG. 4A and FIG. 4B present specific examples of first extracted areas that may be present within the second extracted area.
Figure 4:
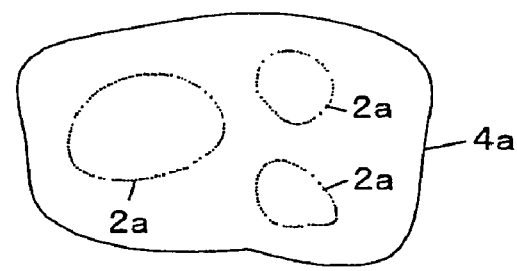

In a second extracted area 4a extracted by setting $Y_1 > Y_2$ as explained above, a single extracted area 2a may be present, as shown in FIG. 4A, or a plurality of first extracted areas 2a may be present as shown in FIG. 4B. The light source area designating unit 103a in the embodiment designates a light source area through different methods adopted for a second extracted area 4a containing a single first extracted area 2a and a second extracted area 4a containing a plurality of first extracted areas 2a.

While a plurality of second extracted areas may have been extracted from the image, as described earlier, an explanation is given in reference to the embodiment on the processing executed to determine whether or not a given second extracted area 4a is to be designated as a light source area. Namely, if a plurality of second extracted areas 4a has been extracted, a decision as to whether or not each of the second extracted areas 4a should be designated as a light source area can be made simply by executing the processing described below for the individual second extracted areas 4a.

(A) Second extracted area 4a containing a single first extracted area 2a A second extracted area 4a containing a single first extracted area 2a is likely to have a high degree of independence as a light source area and is, therefore, judged to be a light source area unless its shape is skewed. The light source area designating unit 103a makes the decision as to whether or not to designate the second extracted area 4a as a light source area as expressed in (2) and (3) below based upon the distances $b_i$ calculated along the eight directions extending from the gravitational center to the edge of the area. In expressions (2) and (3), max ($b_i$) represents the largest value among $b_1$ through $b_8$ and min ($b_i$) represents the smallest value among $b_1$ through $b_8$. If the condition set forth in expressions (2) is satisfied, the light source area designating unit 103a designates the second extracted area 4a as a light source area, whereas if the condition set forth in expression (3) is satisfied, it does not designate the second extracted area 4a as a light source area.

$$\max(b_i)/\min(b_i) \leq 3.0 \qquad (2)$$

$$\max(b_i)/\min(b_i) > 3.0 \qquad (3)$$

If the second extracted area is designated as a light source area, the light source area designating unit 103a designates the gravitational center position of the first extracted area present inside the second extracted area as a light source position.

(B) Second extracted area 4a containing a plurality of first extracted areas 2a

B indicates the second extracted area 4a and $A_i$ (i=1, 2, . . . , n) indicates a single first extracted area 2a or a plurality (n) of first extracted areas 2a present in the second extracted area. $g_B$ represents the gravitational center of B, whereas $g_i$ (i=1, 2, . . . , n) represents the gravitational center of $A_i$ (i=1, 2, . . . , n).

Since the second extracted area 4a (B) is extracted by using a reference value (threshold value) for intensity values Y set to $Y_2$ (e.g., $Y_2$=240) slightly lower than $Y_1$ (e.g., $Y_1$=250), the second extracted area 4a (B) may contain a plurality of first extracted areas 2a ($A_i$). This may occur for either of the following two reasons.

Reason 1: The second extracted area 4a (B) is not a light source area.

Reason 2: While the second extracted area 4a (B) is a light source area, a plurality of first extracted areas 2a ($A_i$) have been extracted in correspondence to the reference value $Y_1$.

Even when reason 2 above is deemed applicable, i.e., even when B is a light source area, a majority of $A_i$ are judged not to be light source areas. Under such circumstances, a star is drawn by using bright beams extending along a plurality of directions from a starting point set at $g_B$ or at the gravitational center $g_i$ (i=1, 2, . . . , n) of an area $A_i$ reasonably close to $g_B$. The light source area designating unit 103a executes the following processing to make a decision as to whether or not the second extracted area 4a (B) is a light source area.

The light source area designating unit 103a extracts as a gravitational center G the closest gravitational center $g_i$ to the gravitational center $g_B$ of the area B, among the gravitational centers $g_i$ (i=1, 2, . . . , n) of the plurality of areas $A_i$ present within the area B. In the embodiment, if B is judged to be a light source area, the gravitational center G is designated as the light source position and a star is drawn by using bright beams extending along a plurality of directions from the starting point set at the gravitational center G, without drawing a star with bright beams extending along a plurality of directions from a starting point set at another gravitational center $g_i$.

Figure 5:
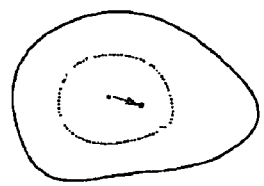
FIG. 5A and FIG. 5B present specific examples of second extracted areas, one in FIG. 5A that is a light source area and the other in FIG. 5B that is not a light source area.
Figure 5:
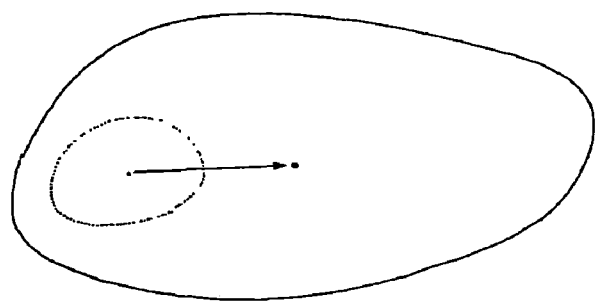

As long as B is a light source area, the position of the gravitational center $g_B$ of B and the position of the extracted gravitational center G should not be set apart from each other over a significant distance, as indicated in FIG. 5A. However, if B is not a light source area, the two positions are set apart by a significant distance, as indicated in FIG. 5B. Based upon this principle, the accuracy of the decision indicating that B is a light source area is judged in the embodiment. More specifically, if the distance between G and $g_B$ is beyond an allowable range, the light source area designating unit 103a judges that the decision indicating that B is a light source area is inaccurate. If, on the other hand, the distance between G and $g_B$ is within the allowable range, it judges at the decision indicating that B is a light source area is accurate.

The light source area designating unit 103a judges that the decision indicating that B is a light source area is inaccurate if the distance between G and $g_B$ satisfies the condition set forth in expression (4) below, but judges that the decision is accurate if the condition is not satisfied.

$$(\text{Distance between } G \text{ and } g_B) > 2 \times \min(a_i) \qquad (4)$$

If the decision indicating that B is a light source area is judged to be accurate through the decision-making executed based upon expression (4), the light source area designating unit 103a makes a decision based upon expressions (5) and (6) below as to whether or not to designate B as a light source area. If the condition set forth in either expression (5) or expression (6) is satisfied, the light source area designating unit 103a does not designate B as a light source area, but it designates B as a light source area if neither of the conditions set forth in expressions (5) and expression (6) is satisfied.

$$\max(b_i)/\min(b_i) > 3.0 \qquad (5)$$

$$(\text{Size of area } B)/(\text{Size of area } A_i \text{ containing } G) > 1.0 + (Y_1/Y_2) \qquad (6)$$

Upon designating B as a light source area, the light source area designating unit 103a designates as the light source position the gravitational center G closest to the gravitational center $g_B$ of B, among the gravitational centers $g_i$ (i=1, 2, . . . , n) of the plurality of areas $A_i$ present in the area B. Through the processing described above, the light source area designating unit 103a is able to designate a light source area and a light source position within the image with superior accuracy.

The star size determining unit 103b determines the size of the star to be drawn from the starting point set at the light source position designated by the light source area designating unit 103a as described above, i.e., determines the width and the length of bright beams. It is preferable that the bright beam width be determined in correspondence to the areal size S of the light source area and the range of the light source area. The range of the light source area is equivalent to the distances $b_i$ (i=1, 2, . . . , 8) to points taken at the edge of the area, calculated along the eight directions by the light source area designating unit 103a through the processing described earlier.

In an image photographed by using an optical filter, bright beams do not become wider once the actual light source exceeds a specific size. Accordingly, it is preferable to set a specific upper limit value (width_limit) for the bright beam width (width) to be drawn in the light source area. Unless such an upper limit is set for the bright beam width to be drawn in a relatively small image, wide bright beams, not in keeping with the image size, may be drawn. For this reason, the upper limit value (width_limit) should be selected by also taking into consideration the image size.

In order to ensure that excessively narrow bright beams, not in keeping with the image size, are not drawn, a lower limit value (Min_width) for to the bright beam width (width) should also be set. The lower limit value (Min_width) may be set to, for instance, 3 [pixels]. The bright beam width (width) should assume an odd number value, to assure symmetry relative to the central axis of the star.

More specifically, the star size determining unit 103b determines the star size as explained below. The star size determining unit 103b selects the upper limit value (width_limit) [pixels] to the bright beam width by applying conditional expressions in (7) through (9) below to the image size W [pixels]×H [pixels].

$$\min(W,H)<1000 \rightarrow \text{width\_limit}=5 \quad (7)$$

$$1000 \leq \min(W,H) \leq 2000 \rightarrow \text{width\_limit}=7 \quad (8)$$

$$2000 < \min(W,H) \rightarrow \text{width\_limit}=9 \quad (9)$$

The star size determining unit 103b calculates an assumed radius (Temp_R) as expressed in (10) below based upon the areal size S of the light source area.

$$\text{Temp\_R} := \sqrt{\frac{S}{\pi}} \quad (10)$$

The star size determining unit 103b calculates an assumed width (Temp_width) [pixels] to be used to determine the bright beam width, as expressed in (11) below.

$$\text{Temp\_width} = 2 \times \min(\min(b_i), \text{Temp\_R}) \quad (11)$$

As indicated in expression (12) below, the star size determining unit 103b sets the bright beam width (width) to the lower limit value (Min_width) if the calculated width (Temp_width) is smaller than the bright beam width lower limit value (Min_width). If, on the other hand, the calculated width (Temp_width) is greater than the bright beam width upper limit value (width_limit), it sets the bright beam width (width) to the bright beam width upper limit value (width_limit), as indicated in expression (13) below.

$$\text{Temp\_width} < \text{Min\_width} \rightarrow \text{width} = \text{Min\_width} \quad (12)$$

$$\text{Temp\_width} > \text{width\_limit} \rightarrow \text{width} = \text{width\_limit} \quad (13)$$

If the calculated width (Temp_width) does not fit either the conditions set forth in expression (12) or expression (13), i.e., if (Min_width)≦(Temp_width)≦(width_limit), the star size determining unit 103b rounds off the value of the calculated width (Temp_width) to an integral value. If the integral value is an odd number, the integral value is directly designated as the bright beam width (width), whereas if the integral value is an even number, the value obtained by adding 1 to the integral value is designated as the bright beam width (width).

Next, a method that may be adopted when determining the length of bright beams in the star is explained. In principle, when the actual light source is larger in size, longer bright beams are drawn and thus, the bright beam length is determined in correspondence to the areal size S of the light source area. It is known that a bright beam length in keeping with the light source size can be selected in proportion to log(S). When the areal size S of the light source area is small, a bright beam length (length) [pixels] calculated as expressed in (14) below may not be large enough and thus may not be in keeping with the light source size. A in expression (14) represents a proportional constant.

$$\text{length} = A \times \log(S) \quad (14)$$

In the embodiment, the minimum length for bright beams is defined and bright beams are drawn over a length equal to or greater than the minimum length at all times. It is preferable that the minimum length be determined in correspondence to the image size W [pixels]×H [pixels]. Since setting a greater length is in keeping with a wider bright beam, the star length is corrected to assume a greater value if bright beams are wider than the lower limit value (Min_width) (=3 [pixels]) mentioned earlier.

Namely, the star size determining unit 103b calculates the bright beam length as expressed in (15) below.

$$\text{length} = \min(W, H)/20 + \max\{\alpha_i\} + A \times \log S \times \left(\frac{\text{width}}{\text{min\_width}}\right)^\alpha \quad (15)$$

In expression (15), the first term (min (W, H)/20) represents the minimum bright beam length (Min_Length) corresponding to the image size and α represents a parameter used to correct the bright beam length in correspondence to the bright beam width as mentioned above.

Figure 6:
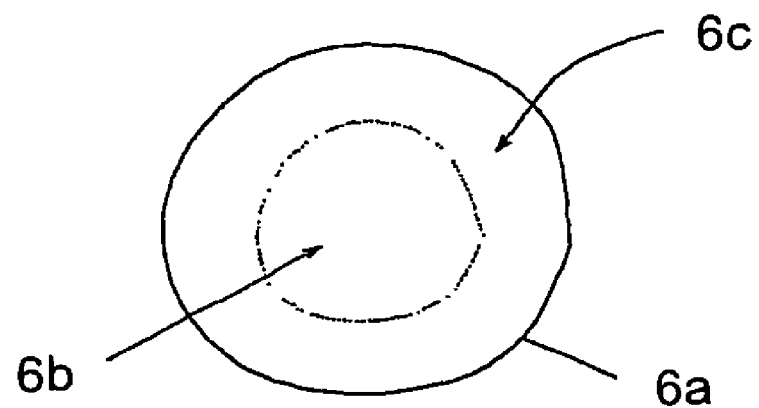
FIG. 6 presents a specific example of a central area and an outer area in the light source area.

The star color determining unit 103c determines the color of the star where bright beams are to be drawn from the starting point set at the light source position designated through the processing executed by the light source area designating unit 103a as explained earlier. The color assumed at the center of a light source area within an image is invariably white, irrespective of the color of the light source. This means that the R, G and B values are all close to 255 and that the R, G and B values are not the best information to be used when determining the star color. In reference to the embodiment, an example in which the star color is determined based upon the color information provided at an outer position in the designated light source area, i.e., at a point set apart from the gravitational center by a specific distance, is explained. For instance, the star color determining unit 103c may determine the color of the star by using the color information provided at a point within an outer area 6c, instead of a central area 6b in the light source area 6a shown in FIG. 6.

More specifically, the star color determining unit 103c may execute the following processing. In order to obtain the color information at a point inside the outer area 6c, the star color determining unit 103c scans the light source area along the eight directions extending from the gravitational center of the light source area, i.e., from the gravitational center $g_B$ of the second extracted area described earlier, in the upward direction, the downward direction, to the left, to the right and in the diagonal directions, to locate points each satisfying the condition set forth in either expression (16) or expression (17), so as to extract one eligible point in correspondence to each direction, i.e., a total of eight points.

$$\max(R,G,B) - \min(R,G,B) > 140 \quad (16)$$

$$Y < 100 \quad (17)$$

The star color determining unit 103c calculates the eight points thus extracted for their hue circle angle distribution and eliminates any point far off the hue circle angle distribution. The star color determining unit 103c then determines the star color (Init_R, Init_G, Init_B) based upon the average of the hue circle angles of the remaining points.

The star drawing unit 103d draws a star in the color having been determined by the star color determining unit 103c by using bright beams with the width and the length having been determined by the star size determining unit 103b extending from the starting point set at the light source position having been designated by the light source area designating unit 103a. The star drawing unit 103d in the embodiment executes processing so as to draw a more natural looking star by reproducing a phenomenon that would manifest if the light source was photographed with an actual star filter.

Figure 7A:
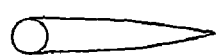
FIG. 7A and FIG. 7B schematically illustrates how a star manifesting in an image may be attenuated by using a star filter.
Figure 7B:

For instance, if the light source was photographed with an actual star filter, the star would become attenuated as the distance from the light source position increased. Namely, a bright beam in a star becomes narrower and the level of intensity becomes lower as the distance from the light source position increases. In addition, a star does not always dissipate through simple attenuation. For instance, a star drawn with bright beams of a significant length may include portions with cyclical attenuation, in which attenuated bright beams become amplified and then become attenuated again. FIG. 7A and FIG. 7B schematically illustrates how a star in an image photographed by using a star filter may become attenuated. For purposes of simplification of the illustration, FIG. 7A and FIG. 7B only shows a single bright beam extending to the right from the light source position in a star formed at the light source area.

When the bright beam is short, it is gradually attenuated and dissipates completely (simple attenuation) as shown in FIG. 7A, whereas if the bright beam is long, the bright beam dissipates after repeating the process of becoming attenuated and then becoming amplified (cyclical attenuation), as shown in FIG. 7B. The star drawing unit 103d in the embodiment makes a decision as to whether to draw the star through simple attenuation or through cyclical attenuation based upon the bright beam length having been determined by the star size determining unit 103b, so as to achieve effects similar to those realized by photographing an image with a star filter.

The bright beams in a star formed in an image photographed by using a star filter become narrower as the distance from the light source position increases, as shown in FIG. 7A and FIG. 7B. For this reason, a star drawn by using a bright beam extending to the right from the light source position and sustaining the bright beam width (width) having been determined by the star size determining unit 103b from the starting point over the full bright beam length (length), as shown in FIG. 8A would not look natural. The star drawing unit 103d in the embodiment instead draws a star by using a bright beam with the pixel row drawn on the central axis of the star assuming a length equal to the calculated bright beam length (length), but the pixel rows of the bright beam drawn above and below the pixel row on the central axis parallel to the pixel row drawn on the central axis assuming smaller lengths further away from the central axis, so that the bright beam becomes narrower as the distance from the light source position increases, as illustrated in FIG. 8B.

When the light source is white, the star formed in an image photographed by using an actual star filter will include a rainbow of color in the bright beam. Accordingly, the star drawing unit 103d adjusts the attenuation processing depending upon whether the star color having been determined by the star color determining unit 103c is white, so as to ensure that the star includes rainbow colors in the bright beams. The following is a description of a specific example of processing that may be executed by the star drawing unit 103d.

Based upon the star color (Init_R, Init_G, Init_B) having been determined by the star color determining unit 103c, the star drawing unit 103d makes a decision as to whether or not the color of the star to be drawn is white. In more specific terms, if the star color (Init_R, Init_G, Init_B) satisfies the condition expressed in (18) below, the star color is judged to be white, whereas if it does not satisfy the condition, the star is assumed to be a color other than white.

$$\max(\text{Init\_}R,\text{Init\_}G,\text{Init}B)-\min(\text{Init\_}R,\text{Init\_}G,\text{Init}B) < 30 \qquad (18)$$

The star drawing unit 103d executes the star drawing processing based upon the star color having been determined. The drawing processing executed when the star color is other than white is now explained. In reference to the embodiment, a specific example of the processing executed to draw a bright beam extending from the light source position to the right in the star, as shown in FIG. 7A and FIG. 7B, is described. Since bright beams extending along other directions (e.g., upward, downward and to the left), too, can be drawn along the specific directions by executing processing similar to that explained below, a repeated explanation is not provided.

Based upon the bright beam width (width), the star drawing unit 103d determines through calculation the exact pixel range, ranging above and below the central axis of the star, over which the bright beam needs to be drawn, as expressed in (19) below. In the expression (19), n represents the number of pixel rows present above and below the central axis of the star, over which the bright beam needs to be drawn.

$$n=(\text{width}-1)/2 \qquad (19)$$

For instance, width=5 in the example presented in FIG. 8A and FIG. 8B and, in this case, n is calculated to be 2, since the bright beam needs to be drawn over two pixel rows above and below the central axis of the star.

In this example, described by assuming that a bright beam extending from the light source position to the right is being drawn, the star drawing unit 103d calculates the range over which the bright beam needs to be drawn, represented by a specific number of pixel rows present above and below the central axis of the star. When drawing a bright beam extending upward or downward from the light source position, on the other hand, the star drawing unit 103d will need to calculate the range over which the bright beam is to be drawn, represented by a specific number of pixel rows present to the left and to the right of the central axis of the star.

The star drawing unit 103d calculates the length to be assumed for the pixel row in the bright beam, to be drawn on the central axis of the star and the length to be assumed for each pixel row in the bright beam, to be drawn above or below the central axis. The bright beam length (length) has already been calculated. While the length of the pixel row in the bright beam to be drawn on the central axis of the star assumes the value of the bright beam length (length), the pixel rows in the bright beam to be drawn above and below parallel to the pixel row on the central axis need to assume smaller length as the distance from the central axis increases, as explained earlier in reference to FIG. 8A and FIG. 8B. Accordingly, $\text{end}_k$ representing the length of the pixel row present at a kth position (k=1, 2, ..., n) from the central axis may be calculated as expressed in (20) and (21) with L representing the third term in expression (15).

The term $\text{end}_0$ indicates the length of the pixel row in the bright beam to be drawn on the central axis of the star and $\text{end}_1$ indicates the pixel row length assumed for both the pixel row in the bright beam to be drawn parallel to the central axis at the first position above the central axis and a pixel row in the bright beam to be drawn parallel to the central axis at a first position below the central axis. Likewise, $\text{end}_2$ indicates the pixel row length assumed for both the pixel row in the bright beam to be drawn parallel to the central axis at a second position above the central axis and a pixel row in the bright beam to be drawn parallel to the central axis at a second position below the central axis, and $\text{end}_n$ indicates the pixel row length assumed for the pixel rows in the bright beam to be drawn parallel to the central axis at nth positions above and below the central axis.

$$\text{width}=3 \rightarrow \text{end}_0=\text{length},\text{end}_1=\text{length}-(L/2) \qquad (20)$$

$$\text{width}>3 \rightarrow \text{end}_0=\text{end}_1=\text{length},\text{end}_k=\text{length}-(L/2)\times((k-1)/n) \qquad (21)$$

Based upon the bright beam length (length), the star drawing unit 103d determines whether to draw the star with simple attenuation or with cyclical attenuation, as described earlier. More specifically, it makes the decision as expressed in (22) and (23) below.

$$\text{Length} < 3 \times \text{Min\_Length} \rightarrow \text{simple attenuation} \quad (22)$$

$$\text{Length} \geq 3 \times \text{Min\_Length} \rightarrow \text{cyclical attenuation} \quad (23)$$

A method that may be adopted when drawing a star through simple attenuation is now described. The star drawing unit 103*d* defines a point at which x=Y_br is true, as expressed in (24) below, with x representing the displacement to the right from the light source position.

$$Y\_br = \text{Min\_Length} + \max(a_i) + (L/3) \quad (24)$$

Figure 9:
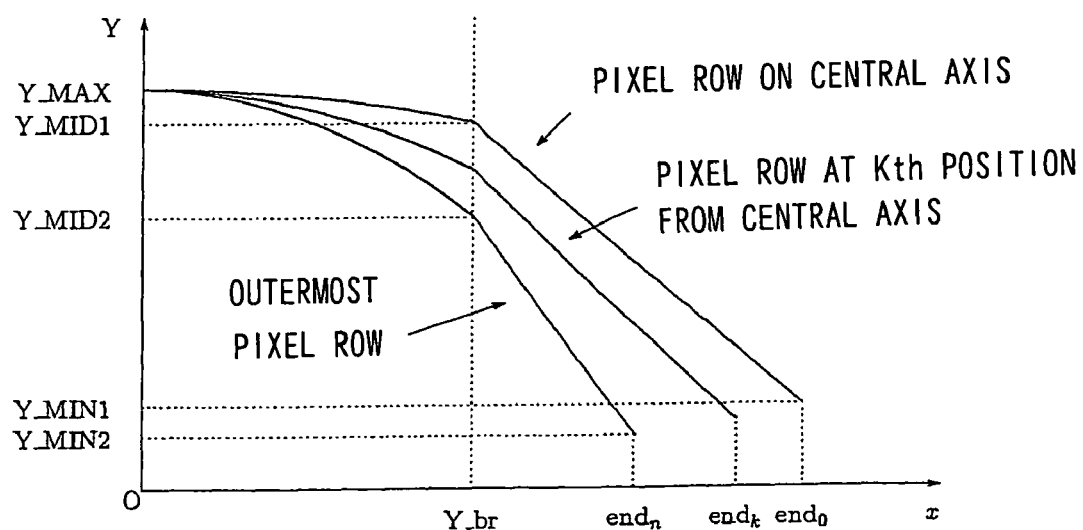
FIG. 9 presents a specific example of Y(x) that may be used in simple star attenuation.

Then, as shown in FIG. 9, a function Y(x), whereby the intensity value Y becomes attenuated as expressed in a quadratic expression when $0 \leq x \leq Y\_br$ and as expressed in a linear expression when $Y\_br \leq x \leq end_k$ is set. Y_MAX, Y_MID1, Y_MID2, Y_MIN1 and Y_MIN2 in FIG. 9 are parameters upon which the bright beam attenuation is dependant and they may be respectively set too, for instance, 250, 200, 150, 80 and 30.

For instance, a function indicating the attenuation of the intensity in the pixel row in the bright beam to be drawn parallel to the central axis at the kth position from the central axis should be determined so that the curve representing the function passes through two points, i.e., (Y_br, Y_MID1−((Y_MID1−Y_MID2)/n)·k) and (end$_k$, Y_MIN1−((Y_MIN1−Y_MIN2)/n)·k).

Once $C_k$ and $D_k$ are defined as expressed in (25) and (26) below, the quadratic expression in the range $0 \leq x \leq Y\_br$ can be written as in (27) and the linear expression in the range $Y\_br \leq x \leq end_k$ can be written as in (28) below.

$$C_k = \frac{\left(Y\_MID1 - \frac{Y\_MID1 - Y\_MID2}{n} \cdot k - Y\_MAX\right)}{(Y\_br)^2} \quad (25)$$

$$D_k = \frac{\left(Y\_MIN1 - \frac{Y\_MIN1 - Y\_MIN2}{n} \cdot k - \atop Y\_MID1 + \frac{Y\_MID1 - Y\_MID2}{n} \cdot k\right)}{(end_k - Y\_br)} \quad (26)$$

$$Y(x) = C_k \cdot x^2 + Y\_MAX \quad (27)$$

$$Y(x) = D_k (x - Y\_br) + Y\_MID1 - \frac{Y\_MID1 - Y\_MID2}{n} \cdot k \quad (28)$$

The RGB values (Cross_R(x), Cross_G(x), Cross_B(x)) at position x in each pixel row included in the bright beam are obtained by first determining color difference values Cr and Cb in the YCbCr color space based upon (Init_R, Init_G, Init_B) and then converting (Y(x), Cb, Cr) to (Cross_R(x), Cross_G(x), Cross_B(x)). Data in the RGB color space are converted to YCbCr color space as expressed in (29) through (31) below, whereas data in the YCbCr color space are converted to the RGB color space by using conversion expressions that are a reversal of those in (29) through (31).

$$Y = 0.2990R + 0.5870G + 0.1140B \quad (29)$$

$$Cr = 0.4978R - 0.4185G - 0.0813B \quad (30)$$

$$Cb = -0.1686R - 0.3311G + 0.4997B \quad (31)$$

Any of Cross_R(x), Cross_G(x) and Cross_B(x) having been calculated that is smaller than 0 is corrected to 0, whereas any of Star_R(x), Star_G(x) and Star_B(x) with a value greater than 255 is corrected to 255.

A mixing ratio Ratio(x) at which the pixel values (R, G, B) in the input image and the (Cross_R(x), Cross_G(x), Cross_B(x)) values are to be mixed is determined, with the pixel values (R(x), G(x), B(x)) at position x calculated as expressed in (32) below.

$$(R(x),G(x),B(x)) = (1.0 - \text{Ratio}(x))(R,G,B) + \text{Ratio}(x) \\ (\text{Cross\_}R(x),\text{Cross\_}G(x),\text{Cross\_}B(x)) \quad (32)$$

Figure 10:
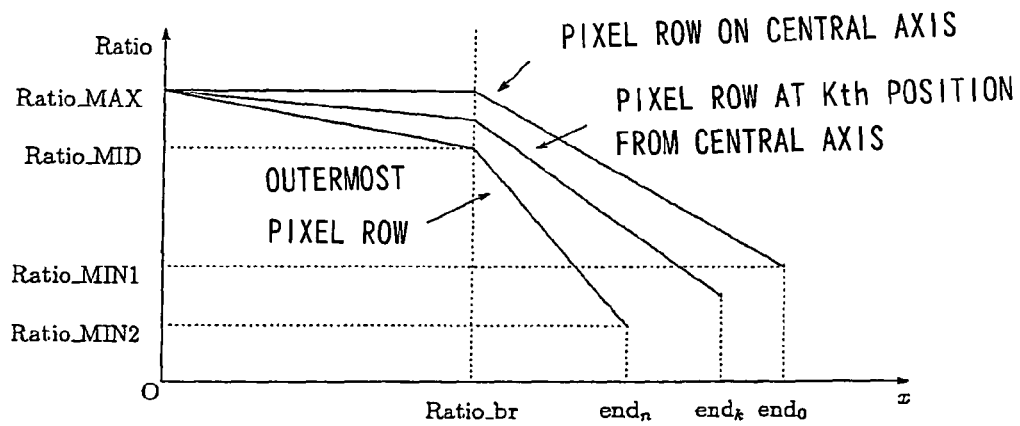
FIG. 10 presents a specific example of Ratio(x) that may be used in simple star attenuation.

The mixing ratio Ratio(x) is a linear function assuming a divergence point at Ratio_br as shown in FIG. 10.

In the example presented in FIG. 10, Ratio_MAX=1.0, Ratio_MID=0.80, Ratio_MIN1=0.40 and Ratio_MIN2=0.20. In addition, the specific Ratio(x) for the pixel row in the bright beam to be drawn parallel to the central axis at the kth position from the central axis is written as a linear expression represented by a curve passing through two points (Ratio_br, Ratio_MAX−((Ratio_MAX−Ratio_MID)/n)·k) and (end$_k$, Ratio_MIN1−((Ratio_MIN1−Ratio_MIN2)/n)·k).

$E_k$ and $F_k$ are defined as expressed in (33) and (34), the linear expression in the range $0 \leq x \leq \text{Ratio\_br}$ is written as in (35) below and the linear expression in the range $\text{Ratio\_br} \leq x \leq end_k$ is written as in (36) below.

$$E_k = -\frac{\text{Ratio\_MID1} - \text{Ratio\_MID2}}{n} \cdot k / \text{Ratio\_br} \quad (33)$$

$$F_k = \frac{\left(\text{Ratio\_MIN1} - \frac{\text{Ratio\_MIN1} - \text{Ratio\_MIN2}}{n} \cdot k - \atop \text{Ratio\_MAX} + \frac{\text{Ratio\_MAX} - \text{Ratio\_MID}}{n} \cdot k\right)}{(end_k - \text{Ratio\_br})} \quad (34)$$

$$\text{Ratio}(x) = E_k \cdot x + \text{Ratio\_MAX} \quad (35)$$

$$\text{Ratio}(x) = \\ F_k(x - \text{Ratio\_br}) + \text{Ratio\_MAX} - \frac{\text{Ratio\_MAX} - \text{Ratio\_MID}}{n} \cdot k \quad (36)$$

The star drawing unit 103*d* calculates pixel values (R(x), G(x), B(x)) at position x by using expression (32) presented earlier and then is able to draw the star in a color other than white through simple attenuation by drawing bright beams extending from the starting point set at the light source position in the image having been designated by the light source area designating unit 103*a*.

A method that may be adopted when drawing a star by cyclically attenuating the star is now explained. As in the case of the simple attenuation, Y(x) and Ratio (x) are set, and the star drawing unit 103*d* calculates the pixel values (R(x), G(x), B(x)) at position x by using expression (32) and draws a star within the image by drawing bright beams extending from the starting point set at the light source position having been designated by the light source area designating unit 103*a*. An explanation of processing similar to that executed in the simple attenuation drawing explained above is not provided.

Figure 11:
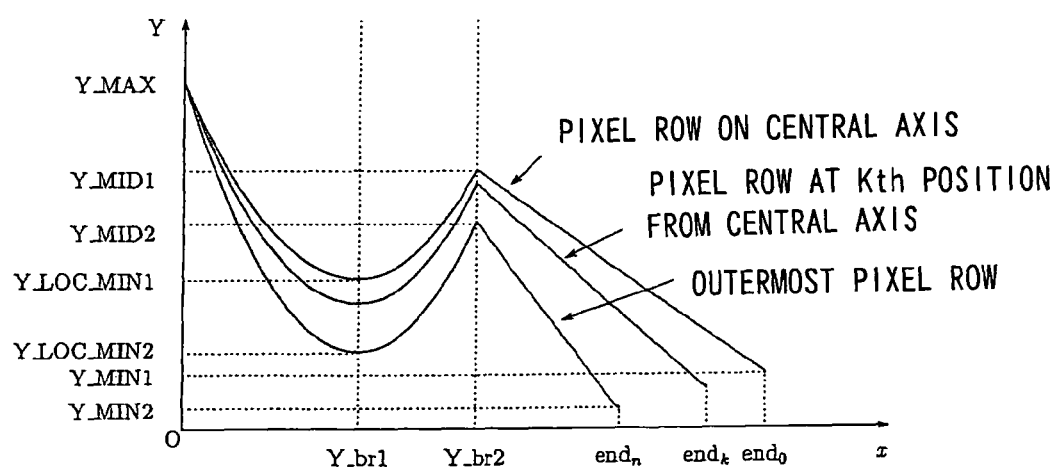
FIG. 11 presents a specific example of Y(x) that may be used in cyclical star attenuation.

The function Y(x) is set so that the attenuated intensity value Y assumes a minimal value when x=Y_br1 and that the intensity value Y undergoes simple attenuation in the range Y_br2≦x, as shown in FIG. 11. For instance, Y_MAX, Y_MID1, Y_MID2, Y_LOC_MINI1, Y_LOC_MINI2, Y_MIN1 and Y_MIN2 may be respectively set to 250, 200, 180, 100, 50, 40 and 20. It is assumed that Y_br1 is equal to length/3 and that Y_br2 is equal to length/2.

The function Y(x) is set so that the intensity value Y becomes attenuated as expressed in a quadratic expression in the range $0 \leq x \leq Y\_br1$ and in the range $Y\_br1 \leq x \leq Y\_br2$ and as expressed in a linear expression in the range $Y\_br2 \leq x \leq end_k$. For instance, a function indicating the attenuation of the intensity in the pixel row in the bright beam to be drawn parallel to the central axis at the kth position from the central axis should be determined so that the curve representing the function passes through three points, i.e., $(Y\_br1, (Y\_LOC\_MID1-((Y\_LOC\_MID1-Y\_LOC\_MID2)/n) \cdot k)$, $(Y\_br2, Y\_MID1-((Y\_MID1-Y\_MID2)/n) \cdot k)$ and $(end_k, Y\_MIN1-((Y\_MIN1-Y\_MIN2)/n) \cdot k)$.

Once $L_k$, $M_k$ and $N_k$ are defined as expressed in (37) (38) and (39) below, the quadratic expression in the range $0 \leq x \leq Y\_br1$ can be written as in (40), the quadratic expression in the range $Y\_br1 \leq x \leq Y\_br2$ can be written as in (41) below and the linear expression in the range $Y\_br2 \leq x \leq end_k$ can be written as in (42) below.

$$L_k = \frac{\left(Y\_MAX - Y\_LOC\_MIN1 + \frac{Y\_LOC\_MIN1 - Y\_LOC\_MIN2}{n} \cdot k\right)}{(Y\_br1)^2} \quad (37)$$

$$M_k = \frac{\left(Y\_MID1 - \frac{Y\_MID1 - Y\_MID2}{n} \cdot k - Y\_LOC\_MIN1 + \frac{Y\_LOC\_MIN1 - Y\_LOC\_MIN2}{n} \cdot k\right)}{(Y\_br2 - Y\_br1)^2} \quad (38)$$

$$N_k = \frac{\left(Y\_MIN1 - \frac{Y\_MIN1 - Y\_MIN2}{n} \cdot k - Y\_MID1 + \frac{Y\_MID1 - Y\_MID2}{n} \cdot k\right)}{(end_k - Y\_br2)} \quad (39)$$

$$Y(x) = L_k \cdot (x - Y\_br1)^2 + Y\_LOC\_MIN1 - \frac{Y\_LOC\_MIN1 - Y\_LOC\_MIN2}{n} \cdot k \quad (40)$$

$$Y(x) = M_k \cdot (x - Y\_br1)^2 + Y\_LOC\_MIN1 - \frac{Y\_LOC\_MIN1 - Y\_LOC\_MIN2}{n} \cdot k \quad (41)$$

$$Y(x) = N_k \cdot (x - Y\_br2) + Y\_MID1 - \frac{Y\_MID1 - Y\_MID2}{n} \cdot k \quad (42)$$

Figure 12:
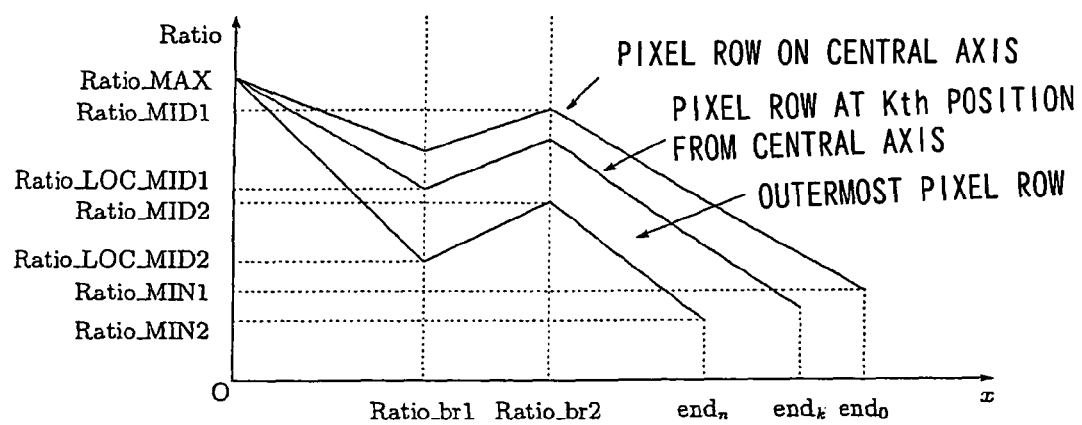
FIG. 12 presents a specific example of Ratio(x) that may be used in cyclical star attenuation.

The mixing ratio Ratio(x) is a linear function assuming divergence points at Ratio_br1 and Ratio_br2, as shown in FIG. 12. It is assumed that the divergence points Ratio_br1 and Ratio_br2 in FIG. 12 are respectively equivalent to Y_br1 and Y_br2 mentioned earlier. Ratio_MAX, Ratio_MID1, Ratio_LOC_MID1, Ratio_MID2, Ratio_LOC_MID2, Ratio_MIN1 and Ratio_MIN2 may be respectively set to 1.0, 0.90, 0.80, 0.60, 0.40, 0.30 and 0.20.

In addition, the specific Ratio(x) for the pixel row in the bright beam to be drawn parallel to the central axis at the kth position from the central axis is written as a linear expression represented by curve passing through three points (Ratio_br1, Ratio_LOC_MID1-((Ratio_LOC_MID1-Ratio_LOC_MID2)/n)·k), (Ratio_br2, Ratio_MID1-((Ratio_MID1-Ratio_MID2)/n)·k) and ($end_k$, Ratio_MIN1-((Ratio_MIN1-Ratio_MIN2)/n)·k).

Once $S_k$, $T_k$ and $U_k$ are defined as expressed in (43) (44) and (45), the quadratic expression in the range $0 \leq x \leq$ Ratio_br1 can be written as in (46) below, the quadratic expression in the range Ratio_br1 $\leq x \leq$ Ratio_br2 can be written as in (47) below and the linear expression in the range Ratio_br2 $\leq x \leq end_k$ can be written as in (48) below.

$$S_k = \frac{\left(\text{Ratio\_MAX} - \text{Ratio\_LOC\_MIN1} + \frac{\text{Ratio\_LOC\_MIN1} - \text{Ratio\_LOC\_MIN2}}{n} \cdot k\right)}{\text{Ratio\_br1}} \quad (43)$$

$$T_k = \frac{\left(\text{Ratio\_MID1} - \frac{\text{Ratio\_MID1} - \text{Ratio\_MID2}}{n} \cdot k - \text{Ratio\_LOC\_MIN1} + \frac{\text{Ratio\_LOC\_MIn2}}{n} \cdot k\right)}{(\text{Ratio\_br2} - \text{Ratio\_br1})} \quad (44)$$

$$U_k = \frac{\left(\text{Ratio\_MIN1} - \frac{\text{Ratio\_MIN1} - \text{Ratio\_MIN2}}{n} \cdot k - \text{Ratio\_MID1} + \frac{\text{Ratio\_MID1} - \text{Ratio\_MID2}}{n} \cdot k\right)}{(end_k - \text{Ratio\_br2})} \quad (45)$$

$$\text{Ratio}(x) = S_k \cdot x + \text{Ratio\_MAX} \quad (46)$$

$$\text{Ratio}(x) = T_k \cdot (x - \text{Ratio\_br1}) + \text{Ratio\_LOC\_MIN1} - \frac{\text{Ratio\_LOC\_MIN1} - \text{Ratio\_LOC\_MIN2}}{n} \cdot k \quad (47)$$

$$\text{Ratio}(x) = U_k \cdot (x - \text{Ratio\_br2}) + \text{Ratio\_MID1} - \frac{\text{Ratio\_MID1} - \text{Ratio\_MID2}}{n} \cdot k \quad (48)$$

When drawing a star assuming a white color, too, the functions Y(x) and Ratio(x) are set in much the same way as when drawing a star in a color other than white, and accordingly, a repeated explanation is omitted. When the star color is white, the values (Cross_R(x), Cross_G(x), Cross_B(x)) at position x are calculated through a method different from that adopted when calculating the corresponding values for a star in a color other than white. Accordingly, the calculation method adopted in conjunction with a white star is explained below.

As explained earlier, a white star in an image photographed by using an actual star filter includes rainbow colors in the bright beams. A star containing rainbow colors in the bright beams is formed as the hue H at position x changes cyclically. More specifically, the star drawing unit 103d assumes temporary RGB values (Y(x), Y(x), Y(x)) at position x and obtains (H, S, V) by converting the R, G and B values in the HSV color space. (H(x), S, H) with H(x) expressed in (49) below replacing H are converted to R, G and B values and these R, G and B values are designated as (Cross_R(x), Cross_G(x), Cross_B(x)) at position x.

$$H(x) = \sin\left(\frac{3}{\text{length}} \cdot 2\pi x\right) \quad (49)$$

The star drawing unit 103d calculates pixel values (R(x), G(x), B(x)) at position x by using expression (32) based upon (Cross_R(x), Cross_G(x), Cross_B(x) at position x calculated as described above and then draws a star with rainbow colors in the bright beams by drawing bright beams over the image, which extend from the starting point set at a light source position having been designated by the light source area designating unit 103a.

The star drawing unit 103d also corrects the star to render an effect of light diffusion over the center of the star, i.e., over the area where the plurality of bright beams intersect one another. For instance, if bright beams extending along four directions, i.e., upward, downward, to the left and to the right, have been drawn to extend from the starting point set at the light source position through the processing described above, noticeable corners are present in the central area of the star, as shown in FIG. 13A. In the embodiment, as shown in FIG. 13B, a light diffusion effect is rendered over the central area of the star so as to achieve the effect similar to that in an image photographed by using an actual star filter.

Figure 14:
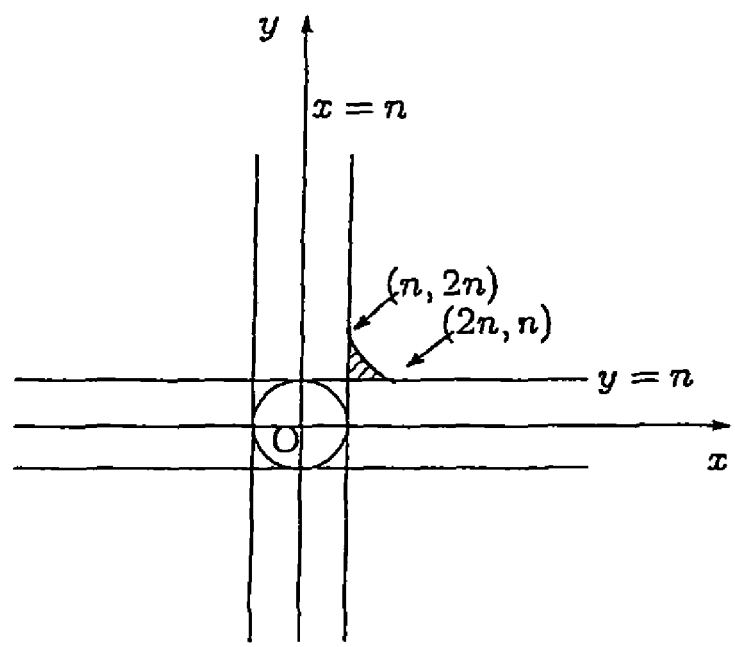
FIG. 14 presents a specific example of the diffusion effect at the central area of a star.

More specifically, the star drawing unit 103d sets an xy coordinate system with the origin point O thereof set at the light source position and renders the light diffusion effect individually in the first quadrant, the second quadrant on the third quadrant and the fourth quadrant of the coordinate system as shown in FIG. 14. While the following explanation focuses on the light diffusion effect rendered in the first quadrant, the light diffusion effect is rendered in the other quadrants through similar processing.

The star drawing unit 103d sets an astroid curve representing an equation written as in (50) below within the first quadrant. This curve passes through two points (n, 2n) and (2n, n) for n=(width−1)/2.

$$x^{\frac{2}{3}} + y^{\frac{2}{3}} = (1 + 2^{\frac{2}{3}})n^{\frac{2}{3}} \tag{50}$$

The star drawing unit 103d designates an area under the curve where x≧n and y≧n are both true as a light diffusion effect target area.

The star drawing unit 103d calculates the intensity value Y(x, y) as expressed in (51) below for each point (x, y) present within the designated area.

$$Y(x, y) = Y\_MAX \times \frac{\sqrt{2n}}{\sqrt{x^2 + y^2}} \tag{51}$$

The star drawing unit 103d is able to render the light diffusion effect over the central area of the star by setting the mixing ratio Ratio(x, y) at which the input image and the intensity value Y(x, y) are to be mixed within the designated area to a predetermined value, e.g., 0.90 and then drawing the star based upon R, G and B values calculated for the individual pixels within the area, as expressed in (32) presented earlier.

Figure 15:
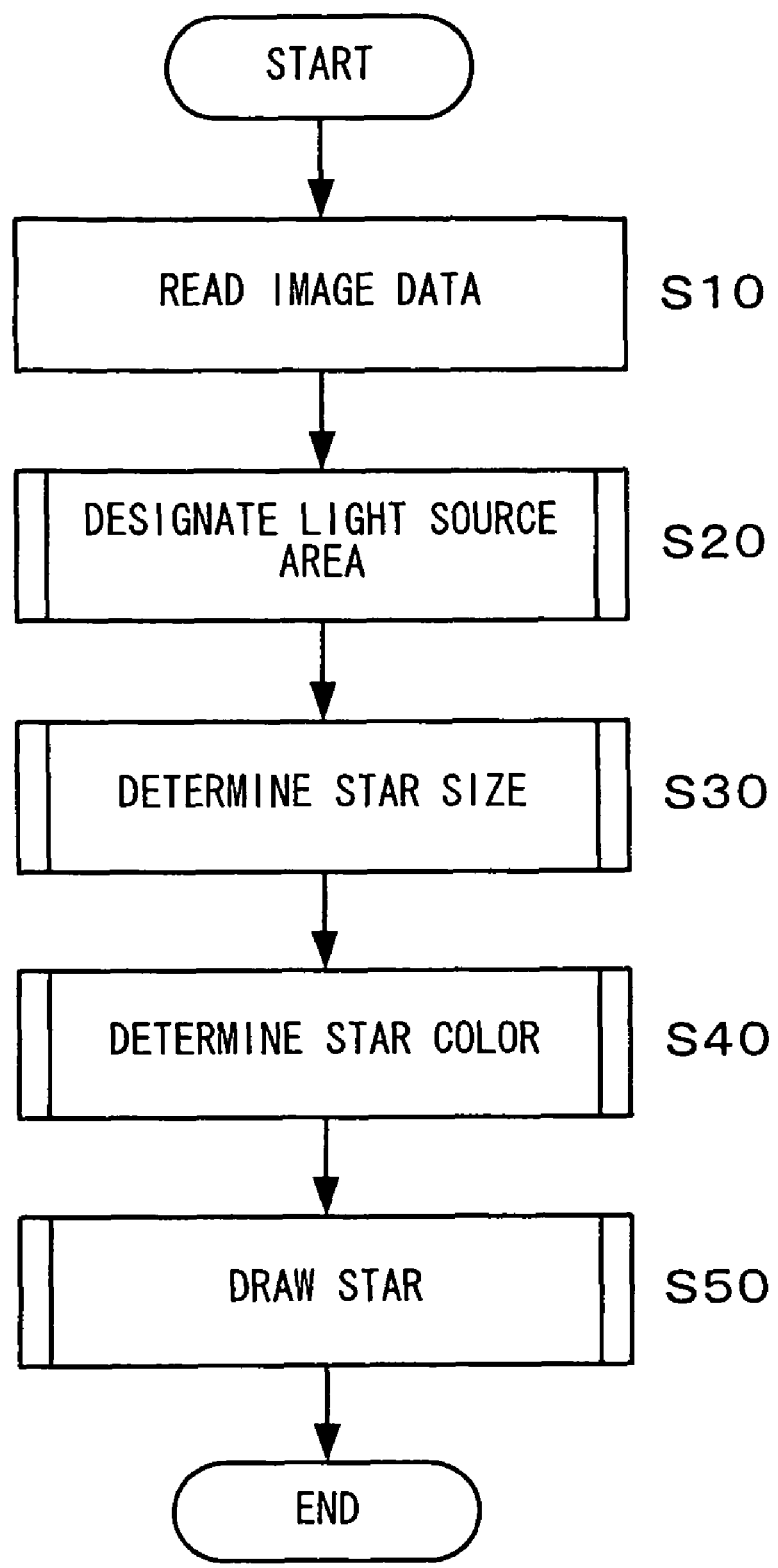
FIG. 15 presents a flowchart of the processing executed in the image processing apparatus.

FIG. 15 presents a flowchart of the processing executed by the image processing apparatus in the embodiment. The processing in FIG. 15 is executed to draw a star in an image by the control device 103 based upon a program started up in response to a star drawing instruction issued by the user.

In step S10, the control device 103 reads star drawing target image data from the HDD 104 and then the operation proceeds to step S20. In step S20, the light source area designating unit 103a executes the processing to be detailed later in reference to FIG. 16 to designate a light source area within the image. Then, the operation proceeds to step S30, in which the star size determining unit 103b executes the processing to be detailed later in reference to FIG. 17 to determine the size of the star to be drawn in the image, i.e., the width and the length of the bright beams. Subsequently, the operation proceeds to step S40.

In step S40, the star color determining unit 103c executes the processing to be detailed later in reference to FIG. 18 to determine the color of the star to be drawn in the image. Then, the operation proceeds to step S50 in which the star drawing unit 103d draws a star in the size determined in step S30 and the color determined in step S40 at the light source position designated in step S20. The processing then ends.

Figure 16:
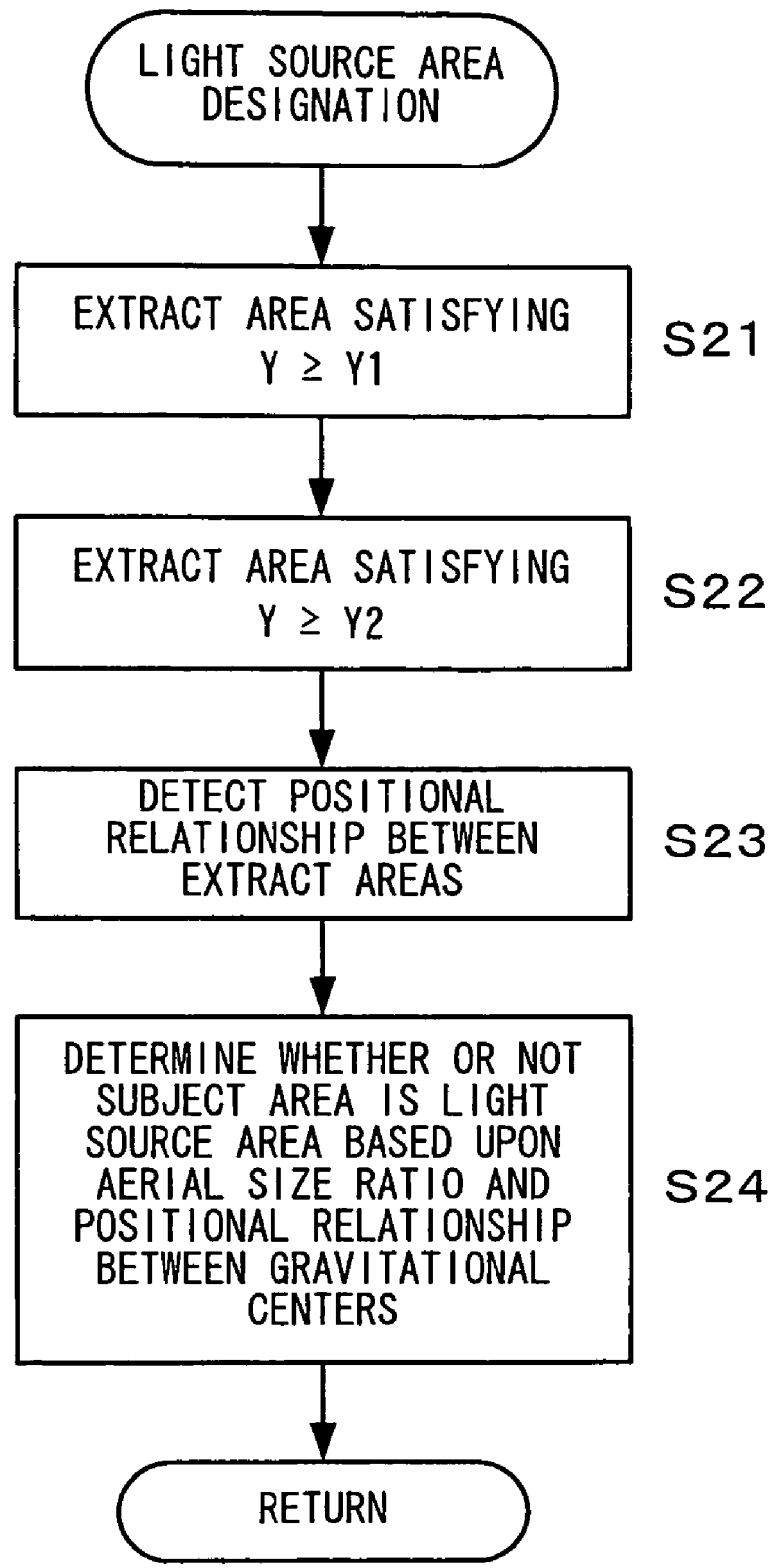
FIG. 16 presents a flowchart of the processing executed to designate a light source area.

FIG. 16 presents a flowchart of the light source area designation processing executed in step S20. In step S21, the light source area designating unit 103a extracts an area (first extracted area) constituted with pixels each assuming an intensity value Y equal to or greater than the predetermined intensity value $Y_1$ (e.g., $Y_1$=250). The operation then proceeds to step S22 in which the light source area designating unit 103a extracts an area (second extracted area) constituted with pixels each assuming an intensity value Y equal to or greater than the predetermined value $Y_2$ (e.g., $Y_2$=240). The operation then proceeds to step S23.

In step S23, the light source area designating unit 103a detects the relationship with which one type of area among the two types of areas having been extracted in steps S21 and S22 is contained in the other type of area. Namely, it determines whether or not the second extracted area contains a plurality of first extracted areas, as explained earlier. Subsequently, the operation proceeds to step S24 in which a decision is made as to whether or not the second extracted area is a light source area based upon the inclusive relationship between the gravitational center of the second extracted area and the gravitational center of each first extracted area present in the second extracted area and the ratio of the areal size of the second extracted area and the areal size of the first extracted area present in the second extracted area and, based upon the results of the decision-making, a light source area is designated in the image. The operation then returns to the processing shown in FIG. 15.

Figure 17:
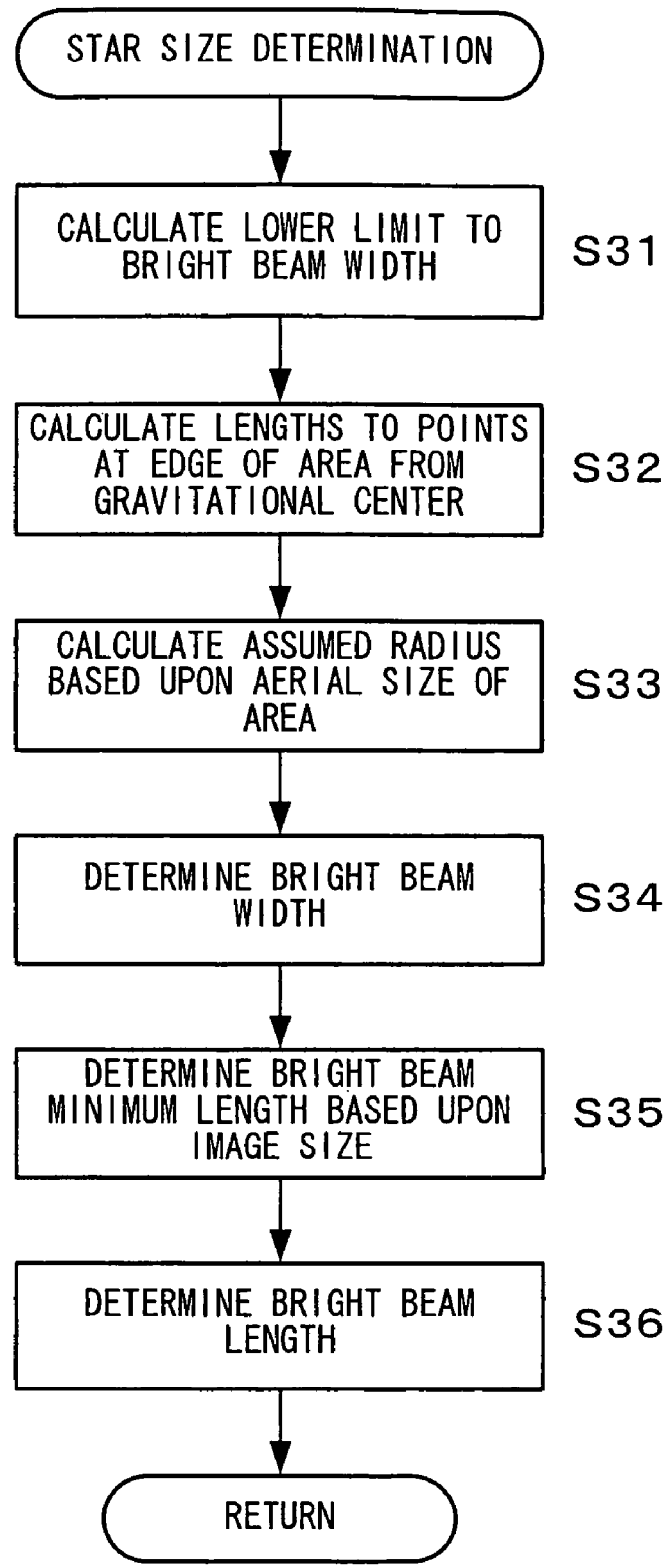
FIG. 17 presents a flowchart of the processing executed to determine the star size.

FIG. 17 presents a flowchart of the star size determining processing executed in step S30. In step S31, the star size determining unit 103b determines the lower limit (Min_width) to the bright beam width based upon the image size W [pixels]×H [pixels]. The operation subsequently proceeds to step S32 in which the star size determining unit 103b calculates the lengths $b_i$ from the gravitational center of the light source area to specific points on the edge of the area, before the operation proceeds to step S33.

In step S33, the star size determining unit 103b calculates the assumed radius (Temp_R) based upon the areal size (S) of the light source area as expressed in (10). Subsequently, the operation proceeds to step S34 in which the star size determining unit 103b determines the bright beam width based upon the relationship between the value of the assumed width (Temp_width) calculated as expressed in (11) and the lower limit (Min_width) value of the bright beam width relative to each other. The operation then proceeds to step S35.

In step S35, the star size determining unit 103b calculates the minimum bright beam length in correspondence to the image size W [pixels]×H [pixels]. The operation then proceeds to step S36 in which the star size determining unit 103b calculates the bright beam length (length) as expressed in (15) mentioned earlier. The operation then returns to the processing shown in FIG. 15.

Figure 18:
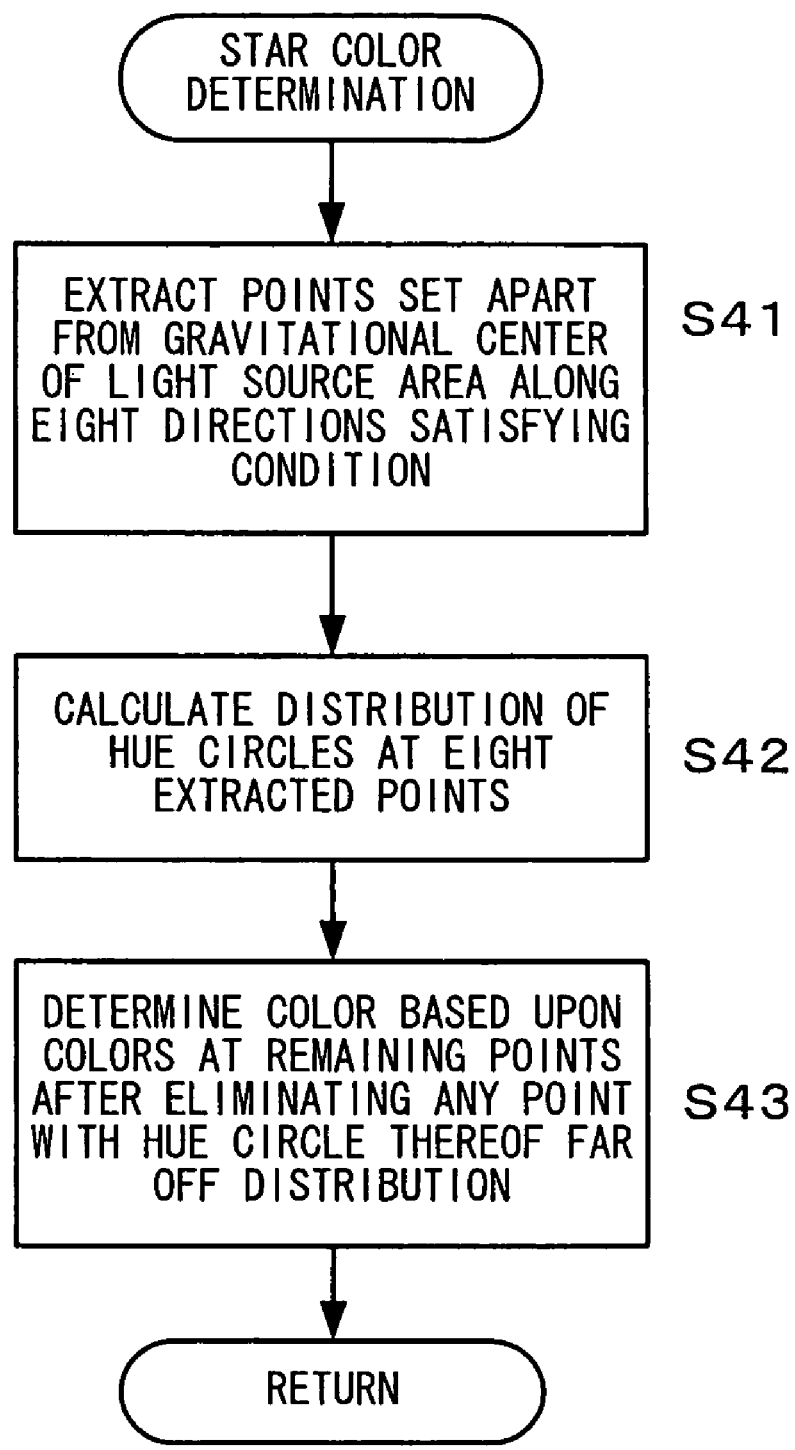
FIG. 18 presents a flowchart of the processing executed to determine the star color.

FIG. 18 presents a flowchart of the star color determining processing executed in step S40. In step S41, the star color determining unit 103c scans the light source area for points at which the condition set forth in either expression (16) or expression (17) is satisfied, along eight directions running from the gravitational center of the light source area, i.e., upward, downward, to the left, to the right and along the diagonals, in order to obtain color information from an outer area of the light source area, i.e., color information sampled at points present within the outer area 6c in FIG. 6. The star color determining unit extracts one point satisfying the condition along each direction, i.e., a total of eight points.

Subsequently, the operation proceeds to step S42, in which the star color determining unit 103c calculates the distribution of the hue circle angles of the eight extracted points, before the operation proceeds to step S43. In step S43, any point, the hue circle angle of which is far off the distribution is eliminated and the star color (Init_R, Init_G, Init_B) is determined based upon the average of the hue circle angles assumed at the remaining points. The operation then returns to the processing shown in FIG. 15.

Figure 19:
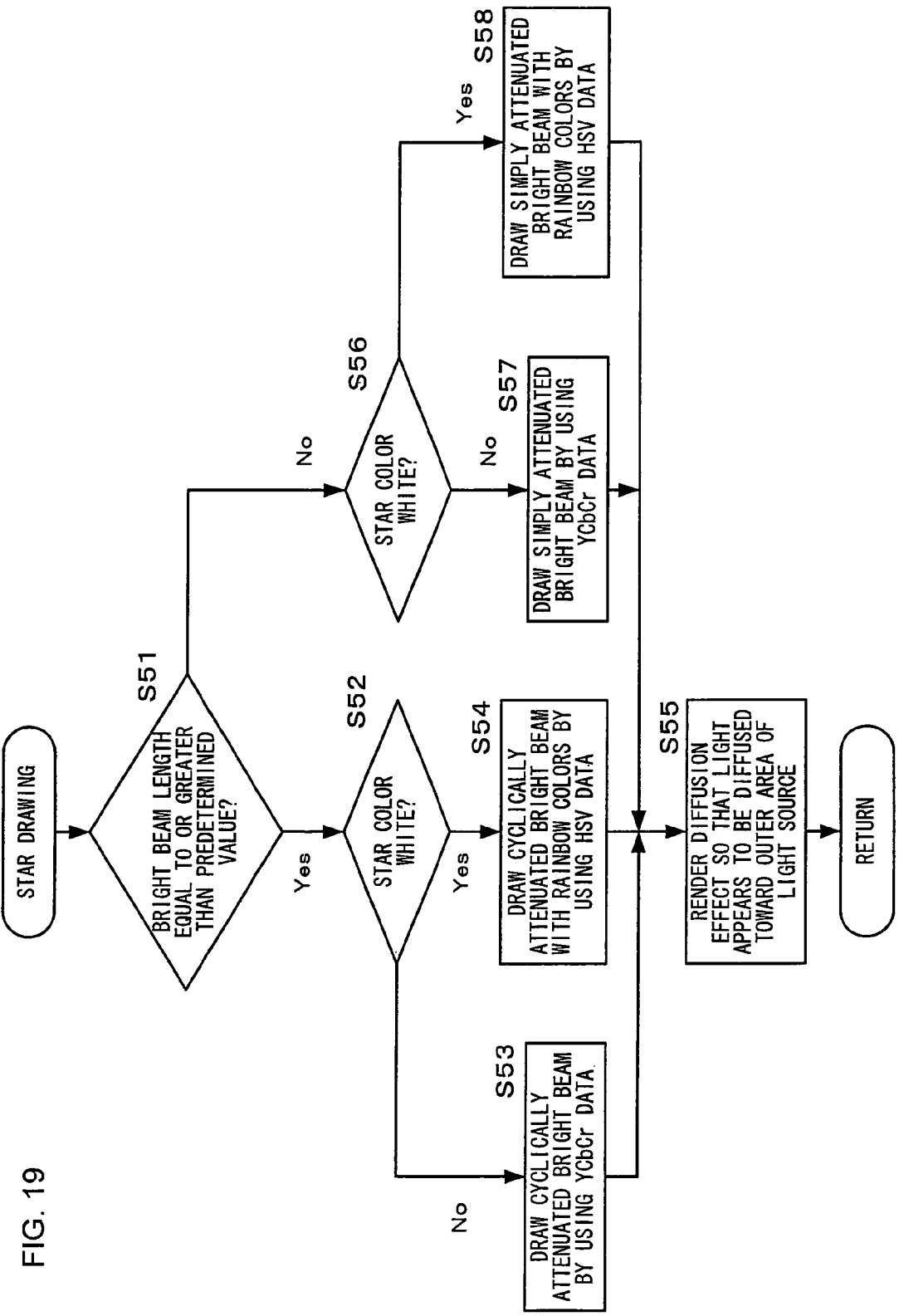
FIG. 19 presents a flowchart of the star drawing processing.

FIG. 19 presents a flowchart of the star drawing processing executed in step S50. In step S51, the star drawing unit 103d makes a decision as to whether or not the bright beam length (length) is equal to or greater than a specific value. If an affirmative decision is made, the operation proceeds to step S52 in which the star drawing unit 103d makes a decision as to whether or not the star color is white. If a negative decision is made, the operation proceeds to step S53 in which the star drawing unit 103d draws a cyclically attenuating star in the YCbCr color space as described earlier and then the operation proceeds to step S55. In step S55, the star drawing unit 103d renders the diffusion effect over the central area of the star before the operation returns to the processing shown in FIG. 15.

If, on the other hand, an affirmative decision is made in step S52, the operation proceeds to step S54 in which the star drawing unit 103d draws a cyclically attenuating star in the HSV color space, before the operation proceeds to step S55. The operation then returns to the processing shown in FIG. 15.

If a negative decision is made in step S51, the operation proceeds to step S56. In step S56, the star drawing unit 103d makes a decision as to whether or not the star color is white. If a negative decision is made, the operation proceeds to step S57 in which the star drawing unit 103d draws a star that is attenuated through simple attenuation in the YCbCr color space as described earlier and then the operation proceeds to step S55. Subsequently, the operation returns to the processing shown in FIG. 15.

If an affirmative decision is made in step S56, the operation proceeds to step S58 in which the star drawing unit 103d draws a star that is attenuated through simple attenuation in the HSV color space as described earlier and then the operation proceeds to step S55. Subsequently, the operation returns to the processing shown in FIG. 15.

Figure 20:
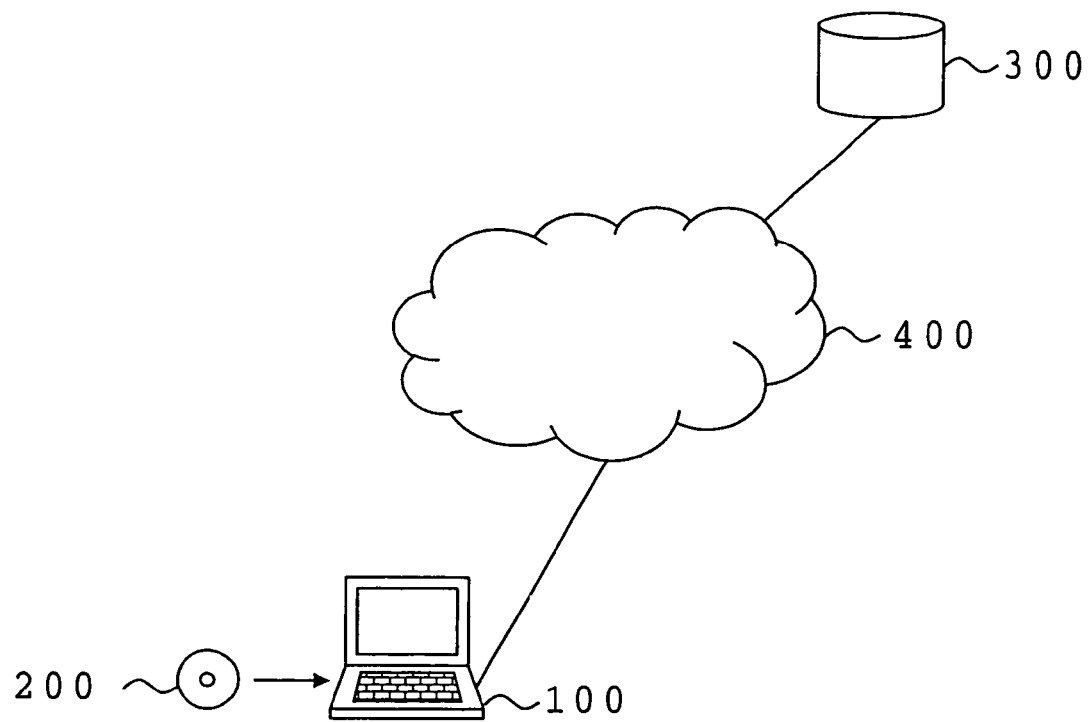
FIG. 20 illustrates how the computer program product to be used to execute the image processing in the embodiment of the present invention, may be distributed.

As explained earlier, the image processing apparatus 100 may be, for instance, a personal computer. The image processing program product according to the present invention may be provided in a recording medium 200 (e.g., a CD-ROM) or as a data signal transmitted through a communication network 400 (e.g., the Internet) as shown in FIG. 20. A personal computer 100 takes in the image processing program via a CD-ROM 200. The personal computer 100 has the capability to connect with a communication network 400. A computer 300 is a server that provides the program stored in a recording medium such as a hard disk. The computer 300 transmits the image processing program read out from the hard disk, embodied as a data signal on a carrier wave, to the personal computer 100 via the communication network 400. In short, the image processing program can be distributed as a computer program product adopting any of various modes including the recording medium 200 and the data signal transmitted via the communication network 400.

The following advantages are achieved in the embodiment described above.

(1) The light source area designating unit 103a extracts an area constituted with pixels each assuming an intensity value Y equal to or greater than the predetermined intensity value $Y_1$ in an image as a first extracted area, extracts an area in the image constituted with pixels each assuming an intensity value Y equal to or greater than a predetermined intensity value $Y_2$ smaller than the intensity value $y_1$ as a second extracted area and designates an area within the image as a light source area based upon characteristic quantities indicating the characteristics of the first extracted area and the second extracted area. As a result, the light source area can be designated with better accuracy compared to the light source area designation executed based upon a single intensity value.

(2) Based upon the ratio of the areal size of the second extracted area and the areal size of the first extracted area present inside the second extracted area and the positional relationship between the gravitational center of the second extracted area and the gravitational center of the first extracted area present inside the second extracted area, the light source area designating unit 103a determines whether or not the second extracted area is a light source area. In other words, the areal sizes and the gravitational center positions are used as the characteristic quantities indicating the characteristics of the first extracted area and the second extracted area. Consequently, a light source area inside the image can be determined with an even higher level of accuracy.

(3) Based upon the positional relationship between the gravitational center of the second extracted area and the gravitational center of the first extracted area present in the second extracted area, the light source area designating unit 103a determines the light source position inside the light source area. Thus, a light source position in the image can be determined with a high level of accuracy.

(4) The star drawing unit 103d draws a star over the image by drawing bright beams along a plurality of directions from the starting point set in the light source area designated by the light source area designating unit 103a. As a result, a star similar to a star that would appear in an image photographed by using an actual star filter can be drawn the light source area in the image.

(5) The star size determining unit 103b determines the width and the length of the bright beams to be drawn based upon the image size and the areal size of the light source area. Consequently, a natural-looking star can be drawn.

(6) The star color determining unit 103c determines the color of the star to be drawn based upon the color information provided at points set apart from the gravitational center in the light source area by a predetermined distance or more. As a result, the optimal star color matching the color of the light source is selected.

(7) The star drawing unit 103d adjusts the star drawing method in correspondence to the length of pixel rows in the bright beams and the star color. More specifically, if the length of pixel rows included in the bright beams is smaller than the predetermined value, the bright beams are drawn so that the intensity of the pixel rows in the bright beams become attenuated through simple attenuation as the distance from the gravitational center of the light source area increases, whereas if the length of pixel rows in the bright beams equal to or greater than the predetermined value, the star drawing unit draws the bright beams so as to cyclically attenuate and amplify the intensity of the pixel rows in the bright beams as the distance from the gravitational center of the light source area increases. When the color of the star is white, the hue of the bright beams changes cyclically. Thus, an image with a star drawn therein, similar to an image obtained by photographing a white-color light source with an actual star filter, is obtained.

(8) The star drawing unit 103d renders an light diffusion effect over an area at which a plurality of bright beams intersect one another, i.e., over the central area of a star. Thus, an image with a star drawn therein, similar to an image obtained by photographing a light source with an actual star filter, is obtained.

-Variations-

The image processing apparatus achieved in the embodiment described above allows for the following variations.

(1) In the embodiment described above, the gravitational center $g_i$ of the first extracted area among a plurality of first extracted areas present in the second extracted area, which is closest to the gravitational center $g_B$ of the second extracted area, is extracted as the gravitational center G and is then designated as the light source position. Then, bright beams are drawn to extend from the starting point set at the light source position. Alternatively, the gravitational centers $g_i$ of first extracted areas present within a predetermined range from the gravitational center $g_B$ of the second extracted area may be all designated as light source positions and bright beams may be drawn from starting points set at the individual light source positions. In addition, the gravitational center $g_B$ of the second extracted area may be designated as the light source position, instead.

(2) The star color determining unit 103c in the embodiment described above scans the light source area along the eight directions extending upward, downward, to the length, to the right and along the diagonals from the gravitational center $g_B$ of the second extracted area to locate points each satisfying the condition set forth either in expression (16) or in expression (17) and extracts one eligible point in correspondence to each direction, i.e., a total of eight points. It then calculates the distribution of the hue circle angles at the extracted eight points, eliminates any point the hue circle angles of which is far off the distribution, and then determines the star color (Init_R, Init_G, Init_B) based upon the average of the hue circle angles at the remaining points. Alternatively, the star color determining unit 103c may extract any four points among the eight points having been extracted, e.g., four points with the third-highest intensity value Y, the fourth highest intensity value Y, the fifth highest intensity value Y and the sixth highest intensity value Y and then may determine the star color (Init_R, Init_G, Init_B) based upon the averages of the values corresponding to the individual colors R, G and B indicated at the four points.

(3) In the embodiment described above, a star is drawn at the light source position having been designated by the light source area designating unit 103a. The light source area or the light source position designated by the light source area designating unit 103a may also be used in another type of image processing. For instance, the image processing of the brightness of the image may automatically be determined based upon the results of analysis of the distribution of light source areas or light source positions inside the image.

(4) An explanation is given above on an example in which the light source area designating unit 103a designates a light source area within an image based upon the areal sizes and the gravitational center positions representing characteristic quantities indicating the characteristics of the first extracted area and the second extracted area. A light source area may instead be designated by using another type of information as characteristic quantities indicating the characteristics of the first extracted area and the second extracted area. For instance, instead of the gravitational center positions indicating the positions of the gravitational centers of the first extracted area and the second extracted area, the positions of points with the highest intensity values in the first extracted area and the second extracted area may be used as characteristic quantities. Alternatively, in place of the gravitational center positions in the first extracted area and the second extracted area, the positions of the central point of the rectangle circumscribing the first extracted area and the central point of the rectangle circumscribing the second extracted area may be used as characteristic quantities. In addition, either the areal sizes or the gravitational center positions alone may be used as characteristic quantities of the first extracted area and the second extracted area. Moreover, the light source area designating unit 103a may designate a first extracted area present within the second extracted area as a light source area in the image without using any characteristic quantities indicating the characteristics of the first extracted area and the second extracted area.

(5) An explanation is given above in reference to the embodiment on an example in which the image processing apparatus 100 is constituted with a personal computer. Instead, the image processing apparatus 100 may be constituted with another type of information device that records images, such as a digital camera or a portable telephone.

The above described embodiment are examples and various modifications can be made without departing from the scope of invention.

What is claimed is:

1. A non-transitory computer-readable medium on which a computer program product containing an image processing control program is stored, the control program comprising:
    a first area extraction instruction for extracting as a first area an area from an image, the first area assuming an intensity value equal to or greater than a first threshold value;
    a second area extraction instruction for extracting as a second area an area from the image, the second area assuming an intensity value equal to or greater than a second threshold value smaller than the first threshold value; and
    a light source area designation instruction for designating an area in the image that contains a light source as a light source area based upon characteristic quantities indicating characteristics of the first area and the second area, wherein
    the first area is wholly within the second area.

2. A non-transitory computer-readable medium according to claim 1, wherein:
    a decision is made in response to the light source area designation instruction, as to whether or not the second area is the light source area based upon a ratio of an areal size of the second area and an areal size of the first area.

3. A non-transitory computer-readable medium according to claim 1, wherein:
    a decision is made in response to the light source area designation instruction, as to whether or not the second area is the light source area based upon a positional relationship between a gravitational center of the second area and a gravitational center of the first area.

4. A non-transitory computer-readable medium according to claim 1, wherein:
    a decision is made in response to the light source area designation instruction, as to whether or not the second area is the light source area based upon a ratio of an areal size of the second area and an areal size of the first area present within the second area and a positional relationship between a gravitational center of the second area and a gravitational center of the first area.

5. A non-transitory computer-readable medium according to claim 1, wherein:
    a light source position present inside the light source area is determined in response to the light source area designation instruction, based upon the positional relationship between the gravitational center of the second area and the gravitational center of the first area.

6. A non-transitory computer-readable medium according to claim 5, with the control program further comprising:
a bright beam drawing instruction for drawing bright beams along a plurality of directions from a starting point set at the light source position designated in response to the light source area designation instruction.

7. A non-transitory computer-readable medium according to claim 6, with the control program further comprising:
a bright beam size determination instruction for determining a width and length of the bright beams to be drawn based upon a size of the image and the areal size of the light source area.

8. A non-transitory computer-readable medium according to claim 6, with the control program further comprising:
a bright beam color determination instruction for determining a color of the bright beams to be drawn based upon color information provided at a point set apart from the gravitational center of the light source area by a predetermined distance or more.

9. A non-transitory computer-readable medium according to claim 7, with the image processing control program further comprising:
a bright beam color determination instruction for determining a color of the bright beams to be drawn based upon information provided at a point set apart from the gravitational center of the light source area by a predetermined distance or more, wherein:
the bright beams are drawn in response to the bright beam drawing instruction, based upon the length of the bright beams determined in response to the bright beam size determination instruction and the color of the bright beams determined in response to the bright beam color determination instruction.

10. A non-transitory computer-readable medium according to claim 9, wherein:
the bright beams are drawn in response to the bright beam drawing instruction, so that intensity of the bright beams is attenuated through simple attenuation as a distance from the light source position increases if the length of the bright beams is smaller than a predetermined value and the bright beams are drawn so as to cyclically attenuate and amplify the intensity of the bright beams as the distance from the light source position increases if the length of the bright beams is equal to or greater than the predetermined value.

11. A non-transitory computer-readable medium according to claim 9, wherein:
the hue of the bright beams is cyclically altered in response to the bright beam drawing instruction, if the color of the bright beams is white.

12. A non-transitory computer-readable medium according to claim 6, wherein:
a light diffusion effect is rendered over and area where a plurality of bright beams intersect one another in response to the bright beam drawing instruction.

13. An image processing apparatus, comprising:
a first area extraction unit that extracts as a first area an area from an image, the first area assuming an intensity value equal to or greater than a first threshold value;
a second area extraction unit that extracts as a second area an area from the image, the second area assuming an intensity value equal to or greater than a second threshold value smaller than the first threshold value;
a light source area designating unit that designates as a light source area an area in the image containing a light source based upon characteristic quantities indicating characteristics of the first area and the second area, the first area being wholly within the second area; and
a control unit that controls the first area extraction unit, the second area extraction unit and the light source area designating unit.

14. An image processing apparatus according to claim 13, wherein:
the light source area designating unit determines whether or not the second area is the light source area based upon a ratio of an areal size of the second area and an areal size of the first area present within the second area and a positional relationship between a gravitational center of the second area and a gravitational center of the first area.

15. An image processing apparatus according to claim 14, wherein:
the light source area designating unit designates a light source position within the light source area based upon the positional relationship between the gravitational center of the second area and the gravitational center of the first area.

16. An image processing apparatus according to claim 15, further comprising:
a bright beam drawing unit that draws bright beams along a plurality directions from a starting point set at the light source position designated by the light source area designating unit.

17. An image processing apparatus according to claim 16, further comprising:
a bright beam size determining unit that determines a width and a length of the bright beams to be drawn based upon a size of the image and the areal size of the light source area; and
a bright beam color determining unit that determines a color of the bright beams to be drawn based upon color information provided at a point set apart from a gravitational center of the light source area by a predetermined distance or more, wherein:
the bright beam drawing unit draws the bright beams based upon the length of the bright beams determined by the bright beam size determining unit and the color of the bright beams determined by the bright beam color determining unit.

* * * * *